US012657666B2

(12) United States Patent
Lee et al.

(10) Patent No.:    US 12,657,666 B2
(45) Date of Patent:    Jun. 16, 2026

(54) IMAGE SIGNAL PROCESSING METHOD USING NEURAL NETWORK MODEL AND COMPUTING APPARATUS FOR PERFORMING THE SAME

(71) Applicant: SAMSUNG ELECTRONICS CO., LTD., Suwon-si (KR)

(72) Inventors: Chaeeun Lee, Suwon-si (KR); Pilkyu Park, Suwon-si (KR); Jaehwan Kim, Suwon-si (KR); Heechul Yang, Suwon-si (KR); Jongseok Lee, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 299 days.

(21) Appl. No.: 18/224,756

(22) Filed: Jul. 21, 2023

(65) Prior Publication Data

US 2023/0386193 A1    Nov. 30, 2023

Related U.S. Application Data

(63) Continuation of application No. PCT/KR2023/007376, filed on May 30, 2023.

(30) Foreign Application Priority Data

May 30, 2022    (KR) ........................ 10-2022-0066331
Jan. 18, 2023    (KR) ........................ 10-2023-0007457

(51) Int. Cl.
*H04N 23/667*    (2023.01)
*G06T 5/60*    (2024.01)
(Continued)

(52) U.S. Cl.
CPC ............ *H04N 23/667* (2023.01); *G06T 5/60* (2024.01); *G06T 5/70* (2024.01); *G06V 10/82* (2022.01); *H04N 23/64* (2023.01)

(58) Field of Classification Search
CPC ...... H04N 23/667; H04N 23/64; H04N 23/80; H04N 23/631; H04N 23/951; G06V 10/82;
(Continued)

(56) References Cited

U.S. PATENT DOCUMENTS 10,460,231 B2    10/2019   Zhang et al.
11,076,103 B2    7/2021    Gordon et al.
(Continued)

FOREIGN PATENT DOCUMENTS

JP        2018124815 A   *   8/2018
JP        2022-51 4580 A        2/2022
(Continued)

OTHER PUBLICATIONS

US 11,729,362 B2, 08/2023, Afifi et al. (withdrawn)
(Continued)

*Primary Examiner* — Syed Haider
(74) *Attorney, Agent, or Firm* — Sughrue Mion, PLLC

(57) ABSTRACT

A method of processing an image by using a neural network model includes obtaining an image captured via an image sensor, identifying a shooting context of the image, selecting a neural network model included in at least one of an image reconstruction module or an image correction module according to the shooting context, and processing the image by using the selected neural network model.

18 Claims, 35 Drawing Sheets

(51) Int. Cl.
    *G06T 5/70*       (2024.01)
    *G06V 10/82*     (2022.01)
    *H04N 23/60*    (2023.01)

(58) Field of Classification Search
    CPC ........ G06V 10/30; G06V 10/454; G06T 5/60;
              G06T 5/70; G06T 2207/20081; G06N
                                  3/0464
    See application file for complete search history.

(56)              References Cited

U.S. PATENT DOCUMENTS

| | | | |
|---|---|---|---|
| 11,379,955 | B2 | 7/2022 | Nair et al. |
| 11,451,699 | B2 | 9/2022 | Chun et al. |
| 11,490,024 | B2 | 11/2022 | Huang |
| 2019/0180418 | A1* | 6/2019 | Kuybeda ................... G06T 5/60 |
| 2020/0334789 | A1 | 10/2020 | Zhang et al. |
| 2021/0133931 | A1 | 5/2021 | Lee et al. |
| 2021/0150660 | A1 | 5/2021 | An et al. |
| 2021/0368094 | A1* | 11/2021 | Li ......................... G06V 10/255 |
| 2022/0051373 | A1 | 2/2022 | Kappel et al. |
| 2022/0068127 | A1* | 3/2022 | Lykkja ................. G06N 3/0464 |
| 2022/0070369 | A1* | 3/2022 | Gordon ..................... G06T 1/00 |
| 2022/0094847 | A1 | 3/2022 | Yang et al. |
| 2022/0132001 | A1 | 4/2022 | Dinh et al. |
| 2022/0164926 | A1 | 5/2022 | Kurmanov et al. |
| 2023/0061884 | A1* | 3/2023 | Kim ..................... G06V 10/776 |

FOREIGN PATENT DOCUMENTS

| | | |
|---|---|---|
| KR | 10-2019-0099914 A | 8/2019 |
| KR | 10-2021-0054907 A | 5/2021 |
| KR | 10-2021-0079282 A | 6/2021 |
| KR | 10-2371880 B1 | 3/2022 |
| KR | 10-2022-0056067 A | 5/2022 |
| KR | 10-2022-0056068 A | 5/2022 |
| KR | 10-2445244 B1 | 9/2022 |
| KR | 10-2471978 B1 | 11/2022 |
| WO | 2022/092555 A1 | 5/2022 |

OTHER PUBLICATIONS

Samsung Electronics Australia, "Using Directors View on my Galaxy Phone", ABN: 63 002 915 648, Apr. 11, 2000, 7 pages, url: https://www.samsung.com/au/support/mobile-devices/directors-view/.

Samsung Electronics Singapore, "Control Your Shots with Director's View on Galaxy S21 Series", 2021, 5 pages, url: https://www.samsung.com/sg/support/mobile-devices/control-your-shots-with-directors-view-on-galaxy-s21-series/.

Tim Brooks et al., "Unprocessing Images for Learned Raw Denoising", Proceedings of IEEE Conference on Computer Vision and Pattern Recognition, Nov. 27, 2018, 9 pages, arXiv:1811.11127v1.

Andrey Ignatov et al., "Replacing Mobile Camera ISP with a Single Deep Learning Model", Proceedings of IEEE/CVF Conference on Computer Vision and Pattern Recognition Workshops, 2020, 11 pages.

Andrey Ignatov et al., "DSLR-Quality Photos on Mobile Devices with Deep Convolutional Networks", Proceedings of the IEEE International Conference on Computer Vision, Sep. 5, 2017, 16 pages, arXiv:1704.02470v2.

International Search Report and Written Opinion (PCT/ISA/220, PCT/ISA/210, and PCT/ISA/237) dated Sep. 6, 2023, issued by International Searching Authority for International Application No. PCT/KR2023/007376.

Extended European Search Report dated Jun. 23, 2025, issued by the European Patent Office in European Application No. 23816335.6.

* cited by examiner

FIG. 1

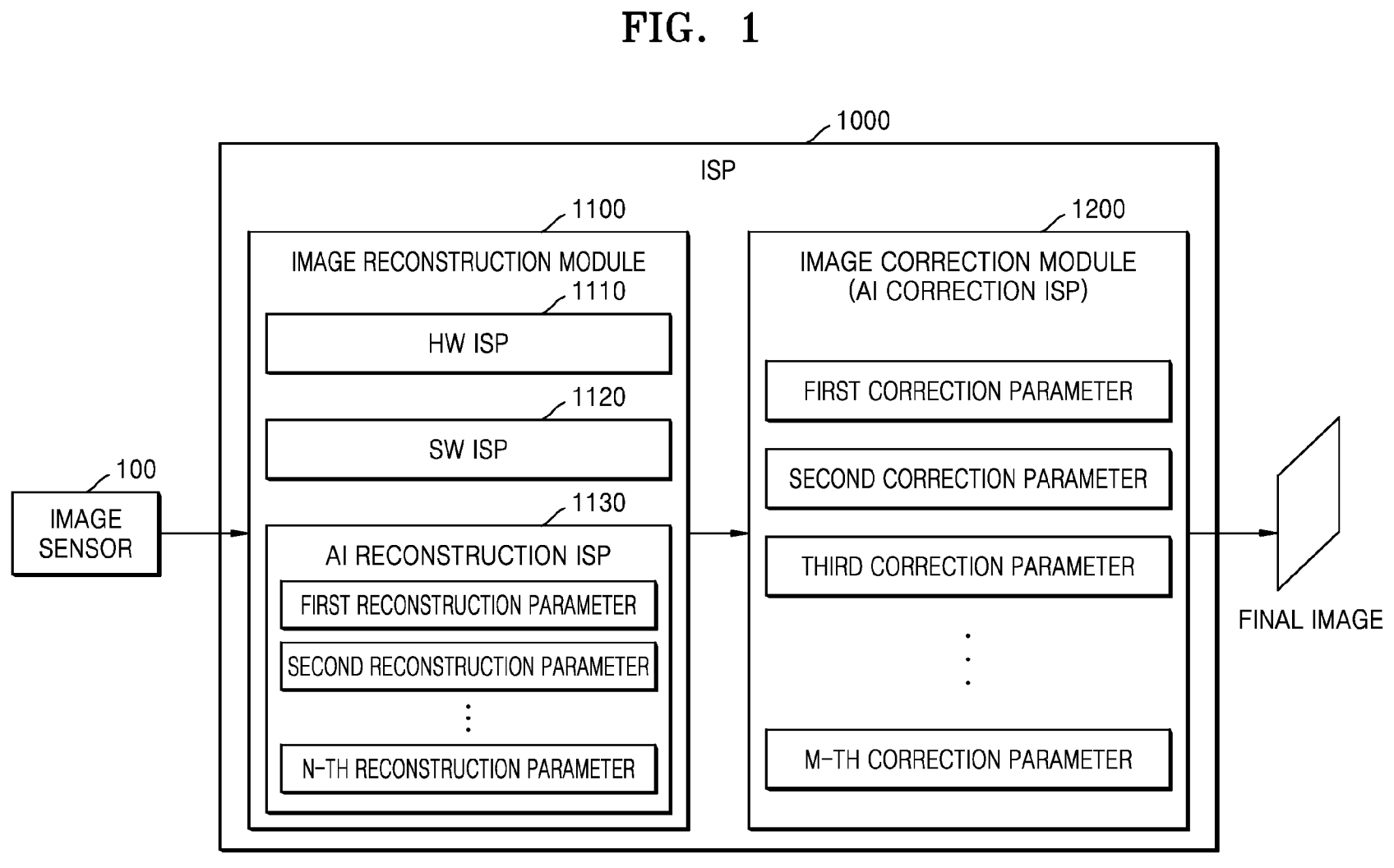

FINAL IMAGE

ISP 1000

IMAGE CORRECTION MODULE (AI CORRECTION ISP) 1200

FIRST CORRECTION PARAMETER

SECOND CORRECTION PARAMETER

THIRD CORRECTION PARAMETER

. . .

M-TH CORRECTION PARAMETER

IMAGE RECONSTRUCTION MODULE 1100

HW ISP 1110

SW ISP 1120

AI RECONSTRUCTION ISP 1130

FIRST RECONSTRUCTION PARAMETER

SECOND RECONSTRUCTION PARAMETER

. . .

N-TH RECONSTRUCTION PARAMETER

IMAGE SENSOR 100

Figure 18:
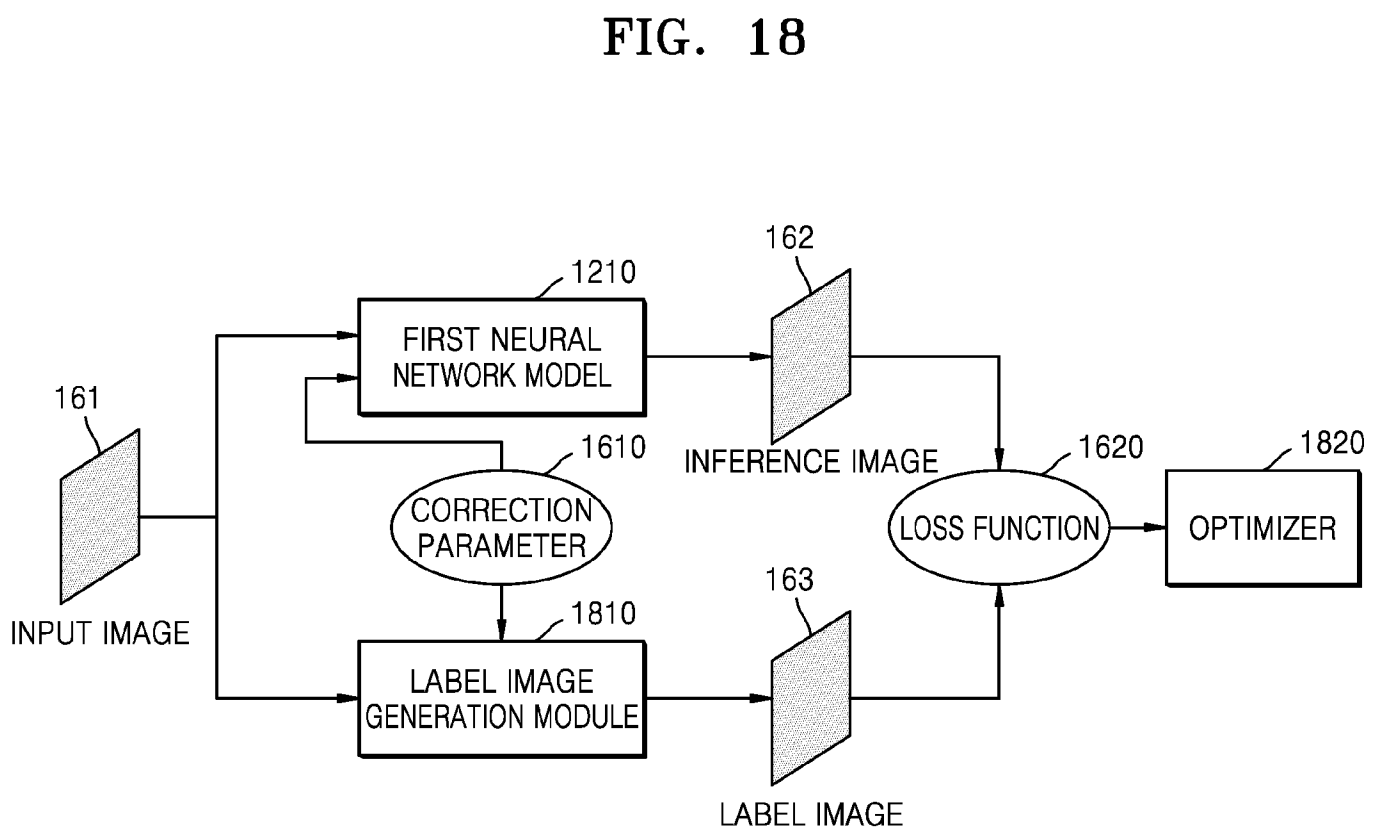

INPUT IMAGE 161

FIRST NEURAL NETWORK MODEL 1210

CORRECTION PARAMETER 1610

LABEL IMAGE GENERATION MODULE 1810

INFERENCE IMAGE 162

LABEL IMAGE 163

LOSS FUNCTION 1620

OPTIMIZER 1820

--- 0.0     —— 0.1     —··—0.2     —— 0.3

Strength

FIG. 23

IMAGE SIGNAL PROCESSING METHOD USING NEURAL NETWORK MODEL AND COMPUTING APPARATUS FOR PERFORMING THE SAME

CROSS-REFERENCE TO RELATED APPLICATIONS

This application is a by-pass continuation of International Application No. PCT/KR2023/007376, filed on May 30, 2023, which is based on and claims priority to Korean Patent Application No. 10-2023-0007457, filed on Jan. 18, 2023, and Korean Patent Application No. 10-2022-0066331, filed on May 30, 2022, in the Korean Intellectual Property Office, the disclosures of which are incorporated by reference herein in their entireties.

BACKGROUND

1. Field

The disclosure relates to an image signal processing method using a neural network model and a computing apparatus for performing the image signal processing method, and more particularly, to a method of selecting a neural network model according to a shooting context in which an image is captured, and reconstructing and correcting the captured image by using the selected neural network model.

2. Description of Related Art

Recently, due to the development of neural network technology, neural networks have been used in various fields. In particular, in the field of image signal processing for performing image correction or reconstruction, processing speed and image characteristics may be improved by using neural networks. For example, a program for correcting an image captured using a built-in camera is installed in a mobile terminal such as a smartphone, and when the program implemented to include existing image correction algorithms can be replaced with a neural network, application of the neural network may be expected to provide advantages in various aspects.

Moreover, the quality of the captured image may be affected by a context in which shooting is performed. For example, an image captured during nighttime may have a lot of noise, and an image captured in a zoom mode may not show colors or edges clearly due to magnification.

Because a neural network model has been trained to correct the characteristics of an image in a preset direction, good image quality may not be guaranteed for all environments when a fixed neural network model is used.

SUMMARY

According to an embodiment of the disclosure, a method of processing an image by using a neural network model includes obtaining an image captured via an image sensor, identifying a shooting context of the image, selecting a neural network model included in at least one of an image reconstruction module or an image correction module according to the shooting context, and processing the image by using the selected neural network model.

According an embodiment of the disclosure, a computing apparatus for processing an image signal by using a neural network model includes a memory storing a program for processing an image signal and at least one processor configured to execute the program to obtain an image captured via an image sensor, identify a shooting context of the image, select a neural network model included in at least one of an image reconstruction module or an image correction module according to the shooting context, and process the image by using the selected neural network model.

According an embodiment of the disclosure, a computer-readable recording medium has stored therein a program for executing, on a computer, the method according to at least one of the embodiments of the disclosure.

According an embodiment of the disclosure, a computer program may be stored in a medium to perform the method according to at least one of the embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a diagram illustrating a configuration of an image signal processing module (ISP) using a neural network model, according to an embodiment of the disclosure;

FIG. 6 is a diagram for describing a method of training a neural network model included in an image reconstruction module, according to an embodiment of the disclosure;

FIG. 18 is a diagram for describing a process of training a first neural network model, according to an embodiment of the disclosure;

FIG. 23 is a diagram for describing an a value applied to an exposure fusion algorithm, according to an embodiment of the disclosure;

DETAILED DISCLOSURE

Figure 2:
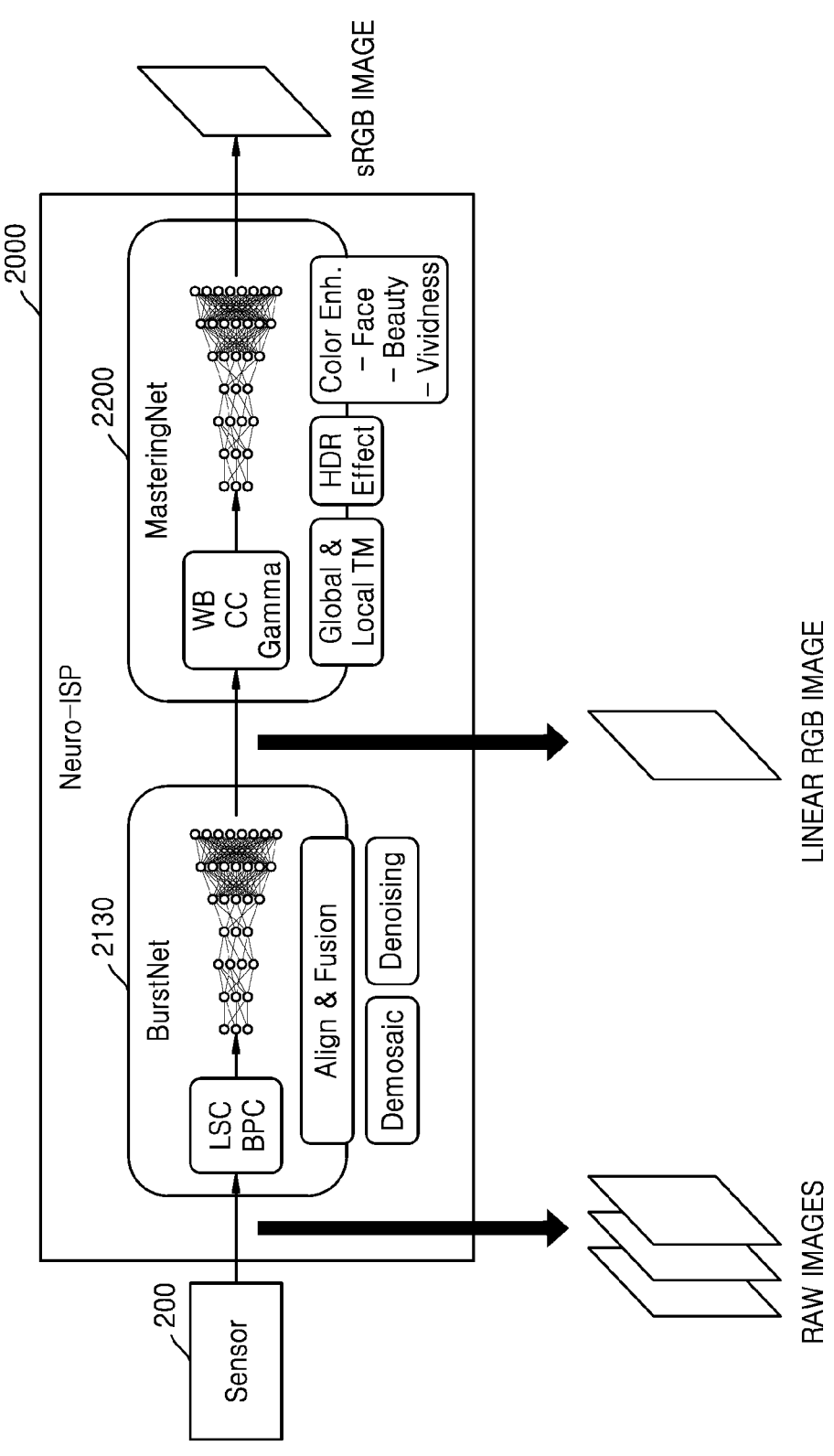
FIG. 2 is a diagram illustrating a specific example of an ISP using a neural network model, according to an embodiment of the disclosure.

Throughout the disclosure, the expression "at least one of a, b or c" indicates any of: only a, only b, only c, both a and b, both a and c, both b and c, all of a, b and c, or variations thereof.

In describing the disclosure, descriptions of technical ideas that are well known in a technical field to which the disclosure pertains and are not directly related to the disclosure will be omitted. This is to more clearly convey the essence of the disclosure without obscuring it by omitting unnecessary descriptions. Furthermore, the terms used hereinafter are defined by taking functions described in the disclosure into account and may be changed according to a user's or operator's intent, practices, or the like. Therefore, definition of the terms should be made based on the overall description of the disclosure.

For the same reason, in the accompanying drawings, some components are exaggerated, omitted, or schematically illustrated. Also, the size of each component does not entirely reflect the actual size. In the drawings, like reference numerals refer to the same or corresponding elements throughout.

Advantages and features of the disclosure and methods of accomplishing the same will be more readily appreciated by referring to the following description of embodiments of the disclosure and the accompanying drawings. However, the disclosure may be embodied in many different forms and should not be construed as being limited to the embodiments set forth below. Rather, the embodiments of the disclosure are provided so that the disclosure will be made thorough and complete and will fully convey the concept of the disclosure to those of ordinary skill in the art to which the disclosure pertains. An embodiment of the disclosure will be defined by the appended claims. Throughout the specification, like reference numerals refer to like elements. Furthermore, in the following description of the disclosure, related functions or configurations will not be described in detail when it is determined that they would obscure the essence of the disclosure with unnecessary detail. Furthermore, the terms used hereinafter are defined by taking functions described in the disclosure into account and may be changed according to a user's or operator's intent, practices, or the like. Therefore, definition of the terms should be made based on the overall description of the disclosure.

In an embodiment of the disclosure, each block of a flowchart in the drawings and combinations of blocks of the flowchart may be performed by computer program instructions. These computer program instructions may be loaded into a processor of a general-purpose computer, special-purpose computer, or other programmable data processing equipment, and thus, the instructions performed by the processor of the computer or the other programmable data processing equipment generate a unit for performing functions specified in the flowchart block(s). The computer program instructions may also be stored in a computer-executable or computer-readable memory capable of directing the computer or the other programmable data processing equipment to implement functions in a specific manner, and thus, the instructions stored in the computer-executable or computer-readable memory are capable of producing items including instruction means for performing the functions described in the flowchart block(s). The computer program instructions may also be loaded into the computer or the other programmable data processing equipment.

In addition, each block may represent a portion of a module, segment, or code that includes one or more executable instructions for executing specified logical function(s). In an embodiment of the disclosure, functions mentioned in blocks may occur out of order. For example, two blocks illustrated in succession may be executed substantially simultaneously, or the blocks may sometimes be executed in reverse order depending on functions corresponding thereto.

As used in an embodiment of the disclosure, the term "unit" denotes a software element or a hardware element such as a field-programmable gate array (FPGA) or an application-specific integrated circuit (ASIC), and may perform certain functions. However, the term "unit" is not limited to software or hardware. The "unit" may be configured to be in an addressable storage medium or configured to operate one or more processors. In an embodiment of the disclosure, the term "unit" may include elements such as software elements, object-oriented software elements, class elements, and task elements, processes, functions, attributes, procedures, subroutines, segments of program code, drivers, firmware, micro-codes, circuits, data, a database, data structures, tables, arrays, and variables. Functions provided by the elements and "units" may be combined into a smaller number of elements and "units", or may be further divided into additional elements and "units". In addition, in an embodiment of the disclosure, the "unit" may include one or more processors.

The disclosure relates to a method of processing an image signal by using a neural network model. Prior to describing specific embodiments of the disclosure, the meanings of terms frequently used in this specification are defined.

A "shooting context" may refer to various factors that affect image shooting or general matters related to the image shooting, and in particular, may mean factors that affect the quality or characteristics of an image being captured. A "shooting context" may include a "shooting condition" and a "shooting mode", and the meaning of each is as follows.

A "shooting condition" is a condition under which an image is captured, and may include at least one of a shooting time (e.g., daytime or nighttime), a shooting location (e.g., an indoor or outdoor location), or International Standards Organization (ISO) (film speed).

A "shooting mode" refers to a mode in which images are captured, and may be set on a shooting device such as a camera. According to an embodiment of the disclosure, a shooting mode may include a normal shooting mode, a night shooting mode, a zoom shooting mode, etc.

Image signal processing (ISP) refers to an operation of processing a digital image signal, and in the disclosure, a module that performs ISP is defined as "ISP".

"Image reconstruction" refers to a process of demosaicing images in Bayer patterns (BayerRG (RGGB), BayerGB (GBRG), BayerBG (BGGR), BayerGR (GRBG)) extracted from a sensor to generate images in red, green, and blue (RGB) patterns. The demosaicing process may include an operation of improving the quality of an image by interpolating some pixel values included in the image or removing noise from the image.

"Image correction" refers to an operation of adjusting image characteristics, and "image characteristic" refers to brightness, contrast, and color temperature of an image. Also, an "image correction algorithm" refers to an algorithm for adjusting the characteristics of an image.

A "correction parameter" refers to a parameter applied to an image correction algorithm when an image is corrected by using the image correction algorithm. In other words, a degree to which the characteristics of the image are adjusted may be determined according to a value of the correction parameter. Specific examples of the correction parameter are described below.

A "label image" is an image used as training data for performing supervised learning on a neural network model according to an embodiment of the disclosure, and in particular, an image used as ground truth data. A "label image generation module" is a component that generates a label image by correcting an input image by using at least one image correction algorithm.

Hereinafter, an embodiment of the disclosure are described in detail with reference to the drawings.

FIG. 1 is a diagram illustrating a configuration of an ISP using a neural network model, according to an embodiment of the disclosure. Referring to FIG. 1, an ISP 1000 according to an embodiment of the disclosure may include an image reconstruction module 1100 and an image correction module 1200. In this case, the image reconstruction module 1100 and the image correction module 1200 are components implemented by executing a program stored in a memory by a processor of a computing apparatus for performing image processing. The computing apparatus for performing image processing may be an apparatus having a shooting function and an arithmetic processing function, such as a smartphone or a digital camera, and may be any of various types of devices (e.g., a laptop and a cloud server) capable of performing an image signal processing process by receiving an image file or a video file even when it does not have a shooting function. A configuration of a computing apparatus that performs image processing according to an embodiment of the disclosure is described in detail below with reference to FIG. 3.

The image sensor 100 is a component that outputs an image signal by performing shooting, and may be, for example, a charge-coupled device (CCD) sensor or a complementary metal-oxide semiconductor (CMOS) sensor. According to an embodiment of the disclosure, the image sensor 100 may output a raw image in a Bayer format having only one color channel for each pixel. However, the image sensor 100 is not limited thereto and may output images in various formats. In addition, according to an embodiment of the disclosure, the image sensor 100 may include a plurality of different types of image sensors. In the disclosure, "different types of image sensors" may also include image sensors with which different types of lenses are matched even though the image sensors themselves have the same hardware specifications. In other words, assuming that the image sensor 100 includes a first image sensor and a second image sensor, and the first image sensor and the second image sensor both have the same hardware specifications, when a normal lens is matched with the first image sensor, and a wide-angle lens is matched with the second image sensor, in the disclosure, the first image sensor and the second image sensor are expressed as different types of image sensors. The image sensor 100 may also include image sensors having different hardware specifications.

The image reconstruction module 1100 is a module for performing an operation of reconstructing an image received from the image sensor 100. According to an embodiment of the disclosure, the image reconstruction module 1100 may perform at least one reconstruction operation, i.e., at least one of lens shading correction (LSC), bad pixel correction (BPC), demosaicing, or denoising on an input image received from the image sensor 100.

As shown in FIG. 1, the image reconstruction module 1100 may include a hardware (HW) ISP 1110, a software (SW) ISP 1120, and an AI reconstruction ISP 1130 as detailed components. At least one of the detailed components included in the image reconstruction module 1100 may be selected depending on a shooting context to perform a reconstruction operation. A method for selecting detailed components of the image reconstruction module 1100 according to a shooting context is described in detail below.

According to an embodiment of the disclosure, the HW ISP 1110 and the SW ISP 1120 may be modules distinguished based on the degree of complexity of a process to be performed thereby. For example, the HW ISP 1110 may be a module for processing only simple processes, and the SW ISP 1120 may be a module for processing relatively complex processes by using SW algorithms.

Among the detailed components included in the image reconstruction module 1100, an artificial intelligence (AI) reconstruction ISP 1130 is a neural network-based module and may include a plurality of neural network models. As shown in FIG. 1, the AI reconstruction ISP 1130 may include a plurality of model parameters (reconstruction parameters) that each represent a neural network model. According to an embodiment of the disclosure, the AI reconstruction ISP 1130 may set a neural network model by using one of the plurality of reconstruction parameters according to a shooting context and perform an image processing process by using the set neural network model.

The image correction module 1200 is a module for performing image correction. The image correction module 1200 may make an image look better by increasing brightness or enhancing a contrast of an image received from the image reconstruction module 1100. According to an embodiment of the disclosure, the image correction module 1200 may adjust image characteristics by performing white balance (or WB) adjustment, color correction (or CC), or gamma value adjustment on the received image, or by performing processes such as global tone mapping and local tone mapping, a high dynamic range (HDR) effect, etc. on the received image.

According to an embodiment of the disclosure, the image correction module 1200 may be configured as a neural network-based module (also referred to as an AI correction ISP) and include a plurality of neural network models. As shown in FIG. 1, the AI correction ISP 1200 may include a plurality of model parameters (correction parameters), each of which represents a neural network model. According to an embodiment of the disclosure, the AI correction ISP 1200 may set a neural network model by using one of the plurality of correction parameters according to a shooting context and perform an image processing process by using the set neural network model.

When shooting in a low-light environment at night, it may be difficult to identify an object in an image due to low brightness or contrast of the image. Furthermore, when shooting in a night mode and increasing an ISO value in order to shoot brightly in a low-light environment, the brightness may be improved, but the amount of noise included in the image may increase, and thus the quality of the image may deteriorate. In addition, when shooting in a zoom mode, the shape or color of an object may not be clearly represented due to magnification of the image.

In this way, the quality of the image may be degraded depending on the shooting context (shooting condition and shooting mode), but an embodiment of the disclosure provide a method for obtaining an optimized high-quality image (e.g., a still image, a video, etc.) in any context. According to an embodiment of the disclosure, the quality of an image may be improved by selecting a detailed component (particularly, a neural network model) included in each of the image reconstruction module 1100 and the image correction module 1200 according to a shooting context. Furthermore, according to an embodiment of the disclosure, the quality of an image may be improved by selecting one of various types of image sensors 100 according to a shooting context.

In addition, camera-related hardware (e.g., including not only direct components for shooting, such as lenses and image sensors, but also processors for processing captured images) may be different for each device, and according to an embodiment of the disclosure, a technical effect such as providing high-quality images above a certain level may be achieved despite these hardware differences.

First, a specific example of a neural network-based ISP is described with reference to FIG. 2, then a specific example of a computing apparatus for performing image processing according to an embodiment of the disclosure is described with reference to FIG. 3, and a method of selecting a neural network model according to a shooting context is thereafter described in detail.

FIG. 2 is a diagram illustrating a specific example of an ISP using a neural network model, according to an embodiment of the disclosure.

The sensor 200 of FIG. 2 may correspond to the image sensor 100 of FIG. 1, and a Neuro-ISP 2000 of FIG. 2 corresponds to a specific embodiment of the ISP 1000 of FIG. 1. The Neuro-ISP 2000 is a component for processing image signals by using a neural network, and according to an embodiment of the disclosure, the Neuro-ISP 2000 may use a method of applying a neural network to a portion of an ISP in module units, or according to an embodiment of the disclosure, the Neuro-ISP 2000 may be an ISP based on a single end-to-end neural network.

A BurstNet 2130 of FIG. 2 corresponds to a specific embodiment of the image reconstruction module 1130 of FIG. 1, and a MasteringNet 2200 of FIG. 2 corresponds to a specific embodiment of the image correction module 1200 of FIG. 1.

Referring to FIG. 2, the sensor 200 may output a plurality of raw images. According to an embodiment of the disclosure, a raw image may be an image in a Bayer format having only one color channel for each pixel.

The BurstNet 2130 may receive a plurality of raw images and output one linear RGB image. The plurality of raw images input to the BurstNet 2130 are a plurality of images captured before and after a specific time point, and the BurstNet 2130 may use temporal information of the raw images and perform LSC, BPC, align & fusion, demosaicing, and denoising on the raw images to thereby output a linear RGB image.

The MasteringNet 2200 may perform correction on the linear RGB image. According to an embodiment of the disclosure, the MasteringNet 2200 may adjust image characteristics by performing white balance adjustment, color correction, or gamma value adjustment on the linear RGB image, or performing processes such as global tone mapping and local tone mapping, an HDR effect, etc. on the linear RGB image, thereby outputting a standard RGB (sRGB) image as a final image. To achieve this, the MasteringNet 2200 may receive a white balance gain (WBG), a color correction matrix (CCM), etc. from the sensor 200.

Moreover, although it has been assumed and described that the image output from the sensor 200 is a Bayer image, the image output from the BurstNet 2130 is a linear RGB image, and the image output from the MasteringNet 2200 is a sRGB image, the disclosure is not limited thereto, and the output images may be images in various formats. For example, each of the above-described images may be any of a non-linear RGB image, a sRGB image, an AdobeRGB image, an YCbCr image, and a Bayer image. However, a format of the input image used when training a neural network model included in each of the BurstNet 2130 and the MasteringNet 2200 may also be maintained the same during inference, and similarly, a format of an inference image used during training may also be maintained the same during inference.

Figure 3:
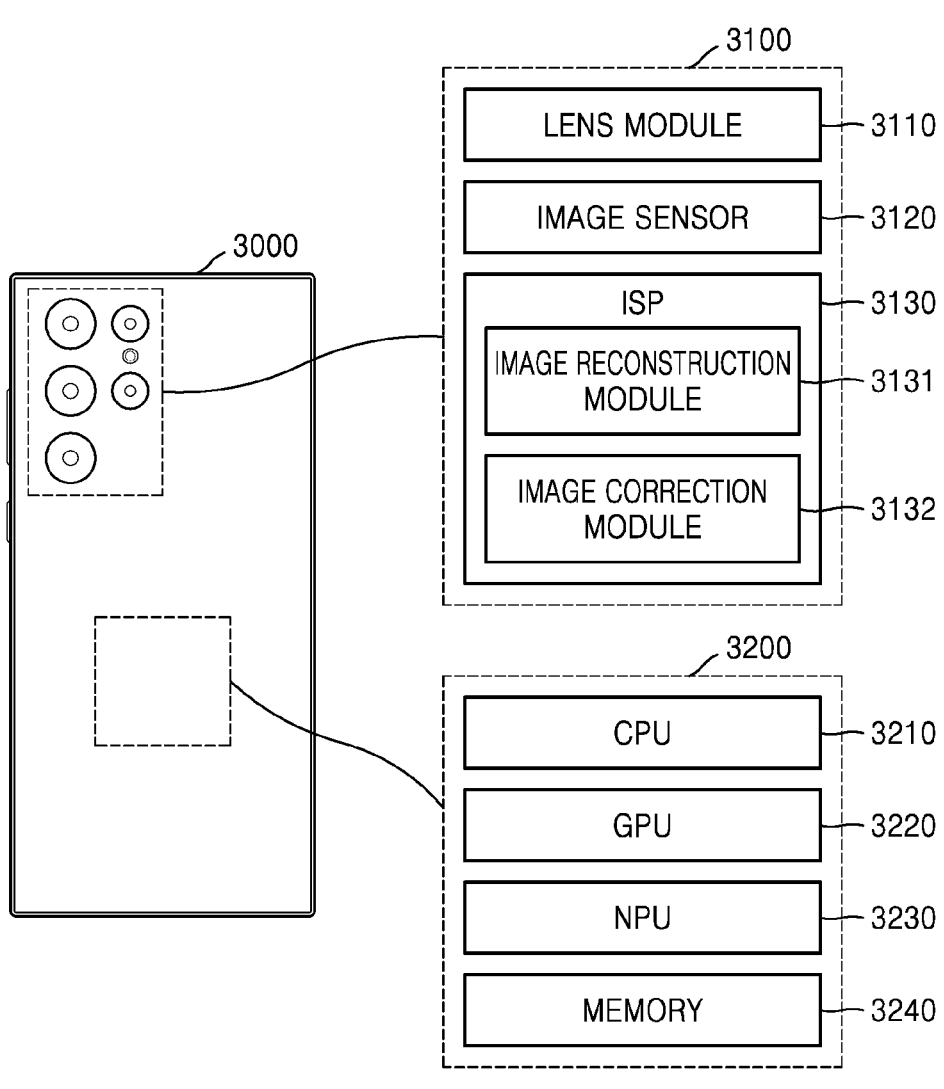
FIG. 3 is a diagram illustrating a configuration of a user terminal that performs image signal processing by using a neural network model, according to an embodiment of the disclosure.

FIG. 3 is a diagram illustrating a configuration of a user terminal that performs image signal processing by using a neural network model, according to an embodiment of the disclosure. Although FIG. 3 shows that a user terminal 3000 for performing image signal processing is a smartphone, the disclosure is not limited thereto, and an ISP 3130 may be installed in all types of devices having an image shooting function, such as a camera, and the ISP 3130 may also be mounted on various types of devices that do not have a shooting function but are capable of performing image signal processing.

Referring to FIG. 3, the user terminal 3000 may include a camera module 3100 and a main processor 3200.

The camera module 3100 may include a lens module 3110, an image sensor 3120, and the ISP 3130, and may also be implemented in the form of a system-on-chip (SoC) that combines these components 3110, 3120, and 3130 into a single chip. The camera module 3100 may further include a separate processor via which the ISP 3130 may be executed.

The image sensor 3120 may receive light transmitted through the lens module 3110 and output an image, and the ISP 3130 may reconstruct and correct the image output from the image sensor 3120 and output the resulting image as a final image. In other words, when a user captures an image via the user terminal 3000, a final image obtained by reconstructing and correcting the captured image via the ISP 3130 is displayed to the user.

The ISP 3130 may include an image reconstruction module 3131 and an image correction module 3132, and operations of the components have been described above with reference to FIGS. 1 and 2.

In the embodiment shown in FIG. 3, the ISP 3130 is mounted on the camera module 3100, but unlike in FIG. 3, the ISP 3130 may also be mounted on the main processor 3200 of the user terminal 3000. The main processor 3200 may include a central processing unit (CPU) 3210, a graphical processing unit (GPU) 3220, a neural processing unit (NPU) 3230, and a memory 3240, and at least one of the CPU 3210, the GPU 3220, or the NPU 3230 may also execute a program stored in the memory 3240 to implement the ISP 3130.

Figure 4:
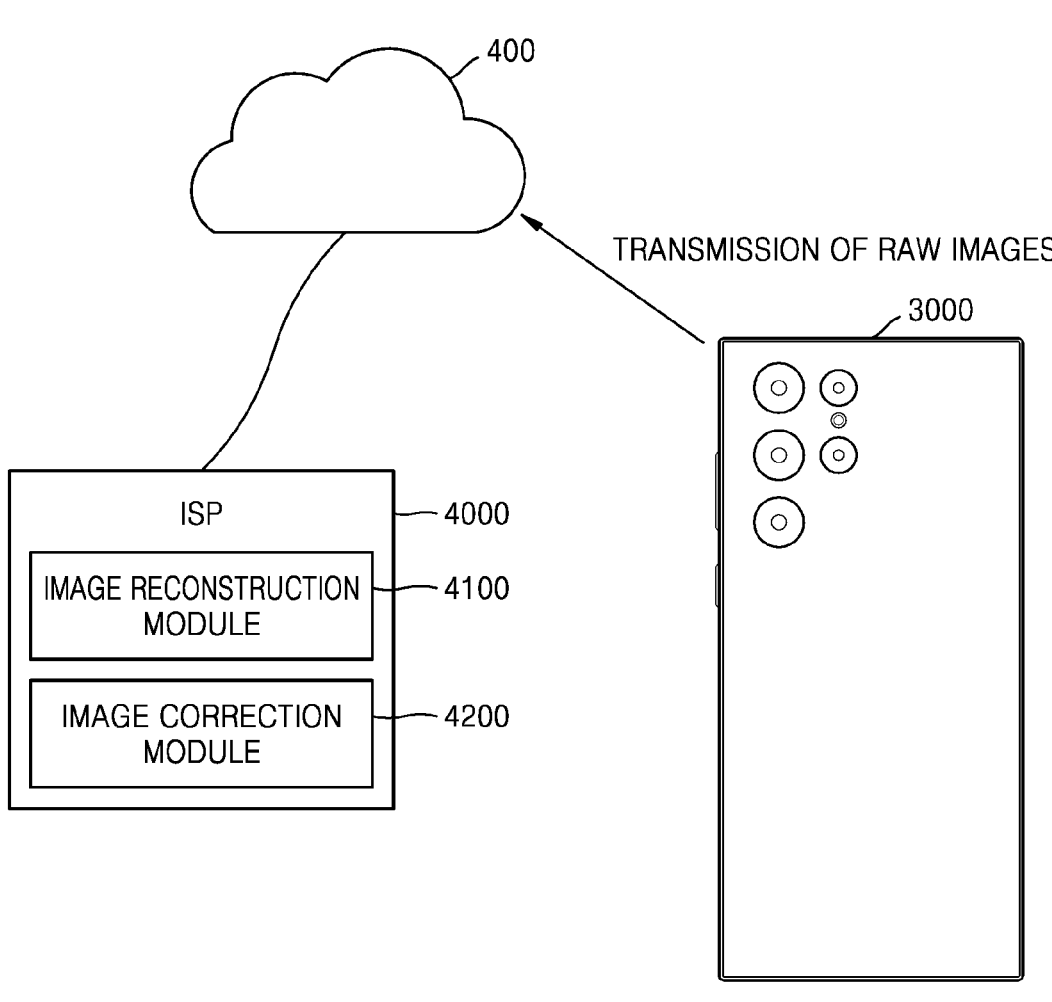
FIG. 4 is a diagram for describing an example in which a cloud server corrects an image received from a user terminal by using an ISP, according to an embodiment of the disclosure.

According to an embodiment of the disclosure, at least some of the components included in the ISP 3130 may be implemented in an external device, such as a cloud server, rather than being mounted on a device for shooting images. For example, as shown in FIG. 4, an ISP 4000 including an image reconstruction module 4100 and an image correction module 4200 may be implemented in a cloud server 400, and when the user terminal 3000 transmits raw images obtained via the image sensor 3120 to the cloud server 400, the image reconstruction module 4100 of the cloud server 400 may generate a linear RGB image based on the raw images, and the image correction module 4200 may correct the linear RGB image and then store the corrected image in the cloud server 400 or transmit it to the user terminal 3000.

Alternatively, according to an embodiment of the disclosure, the user terminal 3000 may reconstruct the linear RGB image from the raw images and transmit the reconstructed linear RGB image to the cloud server 400, and the cloud server 400 may correct the reconstructed linear RGB image by using the image correction module 4200 and then store the corrected image in the cloud server 400 or transmit the corrected image to the user terminal 3000.

Accordingly, in the following embodiment of the disclosure, operations performed by the ISP 1000 of FIG. 1 may be actually performed by the user terminal 3000, the cloud server 400, or each of other various computing apparatuses or a combination of two or more computing apparatuses.

1. Selecting a Neural Network Model in an Image Reconstruction Module

Figure 5:
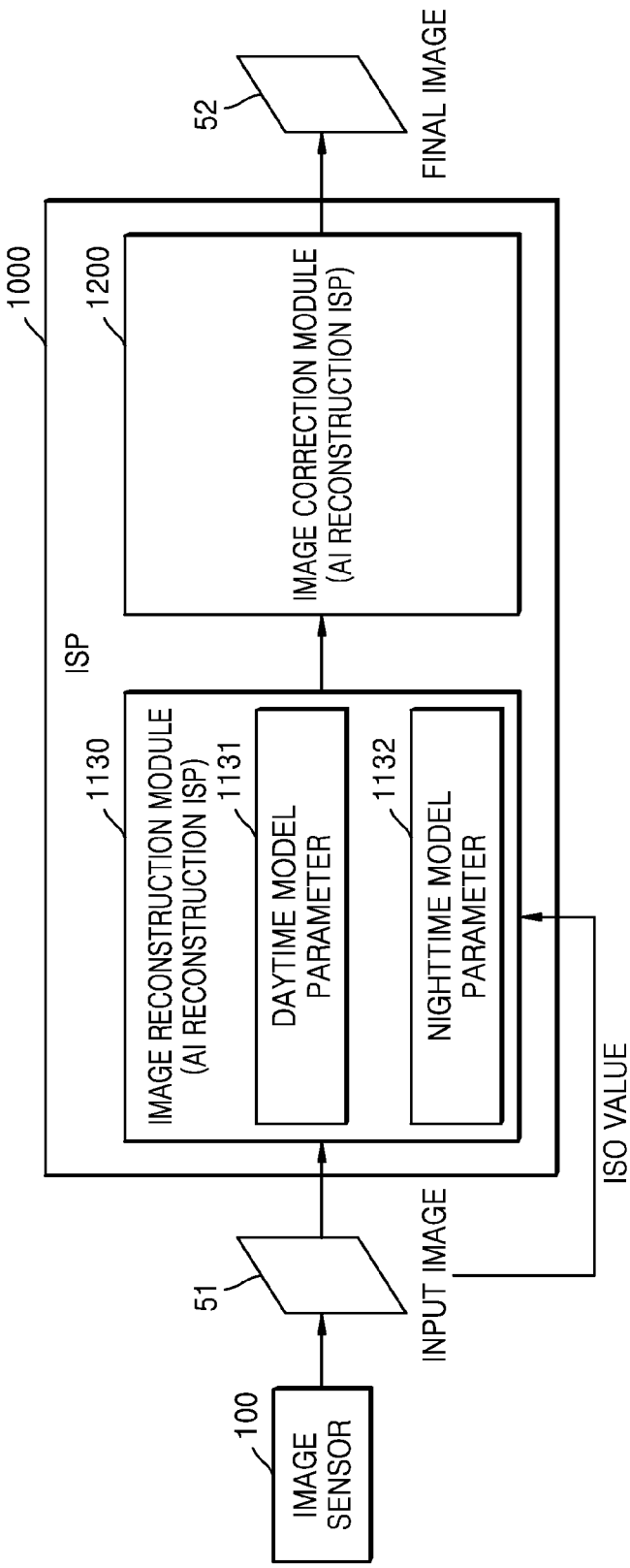
FIG. 5 is a diagram for describing a method of selecting, based on a shooting context, a neural network model included in an image reconstruction module, according to an embodiment of the disclosure.

A method of selecting a neural network model in the AI reconstruction ISP 1130 of the image reconstruction module 1100 of FIG. 1 is described. FIG. 5 is a diagram for describing a method of selecting, based on a shooting context, a neural network model included in the image reconstruction module 1100, according to an embodiment of the disclosure. As shown in FIG. 5, it is assumed that the AI reconstruction ISP 1130 includes a neural network model for daytime (a daytime model parameter 1131) and a neural network model for nighttime (a nighttime model parameter 1132).

According to an embodiment of the disclosure, when the amount of noise contained in an input image 51 is less than a certain reference value, the AI reconstruction ISP 1130 may select the daytime model parameter 1131, and on the other hand, when the amount of noise contained in the input image 51 is greater than or equal to the certain reference value, the AI reconstruction ISP 1130 may select the nighttime model parameter 1132.

(1) Selection of Neural Network Model Based on ISO Value

According to an embodiment of the disclosure, the AI reconstruction ISP 1130 may estimate the amount of noise contained in the input image 51 based on an ISO value for the input image 51, and accordingly select a neural network model thereof based on the ISO value in a shooting condition (time, location, ISO, etc.). For example, the AI reconstruction ISP 1130 may identify an ISO value from metadata of the input image 51 and select a neural network model (a model parameter) based on the identified ISO value. In this case, the input image 51 may be a raw image output from the image sensor 100.

Table 1 below shows the amount of noise estimated according to an ISO value. Shot noise corresponding to an ISO value may be measured differently depending on a device for performing shooting, and read noise is a value calculated from the shot noise by using a particular equation. Therefore, numerical values included in Table 1 are merely an embodiment of the disclosure, and the amount of noise estimated according to an ISO value may vary. In addition, ranges may be further subdivided by adding data between numerical values included in Table 1 via interpolation.

When set to select the nighttime model parameter 1132 when shot noise in the input image 51 is greater than or equal to 0.001 and select the daytime model parameter 1131 when the shot noise is less than 0.001, the AI reconstruction ISP 1130 may set a neural network model to the nighttime model parameter 1132 when the ISO value is 1600 or higher and to the daytime model parameter 1131 when the ISO value is lower than 1600.

TABLE 1

| ISO | shot noise | read noise |
|---|---|---|
| 3200 | 0.005 | 1.53234E−05 |
| 1600 | 0.001 | 3.78202E−07 |
| 640 | 0.0005 | 7.67989E−08 |
| 320 | 0.0001 | 1.8955E−09 |
| 50 | 0.00005 | 3.84906E−10 |

(2) Selection of Neural Network Model Based on Shooting Time and Shooting Location According to an embodiment of the disclosure, the AI reconstruction ISP 1130 may determine whether the input image 51 has been captured in a low-light environment based on a shooting time and a shooting location, and select a neural network model accordingly. For example, the AI reconstruction ISP 1130 may obtain, from metadata of the input image 51, information about a time when and a location (e.g., a location estimated using a global positioning system (GPS) signal, a cellular base station, a WiFi access point (AP), or the like) where the input image 51 is captured, and select a neural network model (a model parameter)

based on the obtained information. According to an embodiment of the disclosure, the AI reconstruction ISP 1130 may select a model parameter for a combination of time (daytime/nighttime) and location (indoor/outdoor) as follows. In general, model parameters are selected according to the rules set forth in Table 2, below, because only outdoor shooting at night may be expected to be shooting in a low-light environment, but the rules are not limited thereto and may be changed according to needs or circumstances.

TABLE 2

| |
| --- |
| 1) Daytime & Outdoor => Daytime model parameter |
| 2) Daytime & Indoor => Daytime model parameter |
| 3) Nighttime & Outdoor => Nighttime model parameter |
| 4) Nighttime & Indoor => Daytime model parameter |

In addition, according to an embodiment of the disclosure, the AI reconstruction ISP 1130 may select a model parameter by taking into account an ISO value together with information about the shooting time and location in order to increase selection accuracy. For example, even in a situation where a daytime model parameter has to be selected as a result of determination based on information about the shooting time and location, the AI reconstruction ISP 1130 may select a nighttime model parameter instead of the daytime model parameter when an ISO value is higher than or equal to a certain reference value. In other words, the AI reconstruction ISP 1130 may primarily select a model parameter based on shooting time and location, and further determine whether the model parameter needs to be changed, based on an ISO value.

Moreover, according to an embodiment of the disclosure, the AI reconstruction ISP 1130 may also determine the amount of noise contained in the input image 51 by analyzing the input image 51 and select a neural network model based on a determination result. For example, the AI reconstruction ISP 1130 may select the nighttime model parameter 1132 when the amount of noise contained in the input image 51 is greater than or equal to a preset reference value as a result of analyzing pixel values of the input image 51, or select the daytime model parameter 1131 when it is less than the preset reference value.

(3) Selection of Neural Network Model According to Shooting Mode or Type of Image Sensor According to an embodiment of the disclosure, the AI reconstruction ISP 1130 may select a neural network model according to a shooting mode or a type of the image sensor 100. For example, the AI reconstruction ISP 1130 may set a neural network model to the daytime model parameter 1131 when in a normal shooting mode (day shooting mode), or set a neural network model to the nighttime model parameter 1132 when in a night shooting mode.

Alternatively, according to an embodiment of the disclosure, when the image sensor 100 includes a plurality of image sensors (See FIG. 8) and one of the plurality of image sensors is selected to capture the input image 51, a neural network model corresponding to the selected image sensor may be selected in the AI reconstruction ISP 1130. To this end, types of image sensors respectively corresponding to the neural network models included in the AI reconstruction ISP 1130 may be predetermined. For example, when the image sensor 100 includes an image sensor for nighttime shooting (e.g. an image sensor suitable for use with a wide-angle lens) and the input image 51 is captured using the image sensor for nighttime shooting, the AI reconstruction ISP 1130 may set a neural network model to the nighttime model parameter 1132.

In the embodiment of the disclosure shown in FIG. 5, the AI reconstruction ISP 1130 includes the two model parameters (1131 and 1132) but is not limited thereto, and three or more model parameters may be included in the AI reconstruction ISP 1130, and ranges of an ISO value and noise used as a reference for selection may also be further subdivided.

2. Training of Neural Network Model Included in Image Reconstruction Module

As described above, the AI reconstruction ISP 1130 may select a neural network model according to the amount of noise contained in the input image 51, and the selected neural network model may perform an appropriate reconstruction process according to the amount of noise. To this end, a method of training the neural network models included in the AI reconstruction ISP 1130 is described.

According to an embodiment of the disclosure, training may be performed by updating model parameters in the AI reconstruction ISP 1130 to minimize a difference between an image output when an image including noise is input to the AI reconstruction ISP 1130 and an image from which noise is removed.

Figure 6:
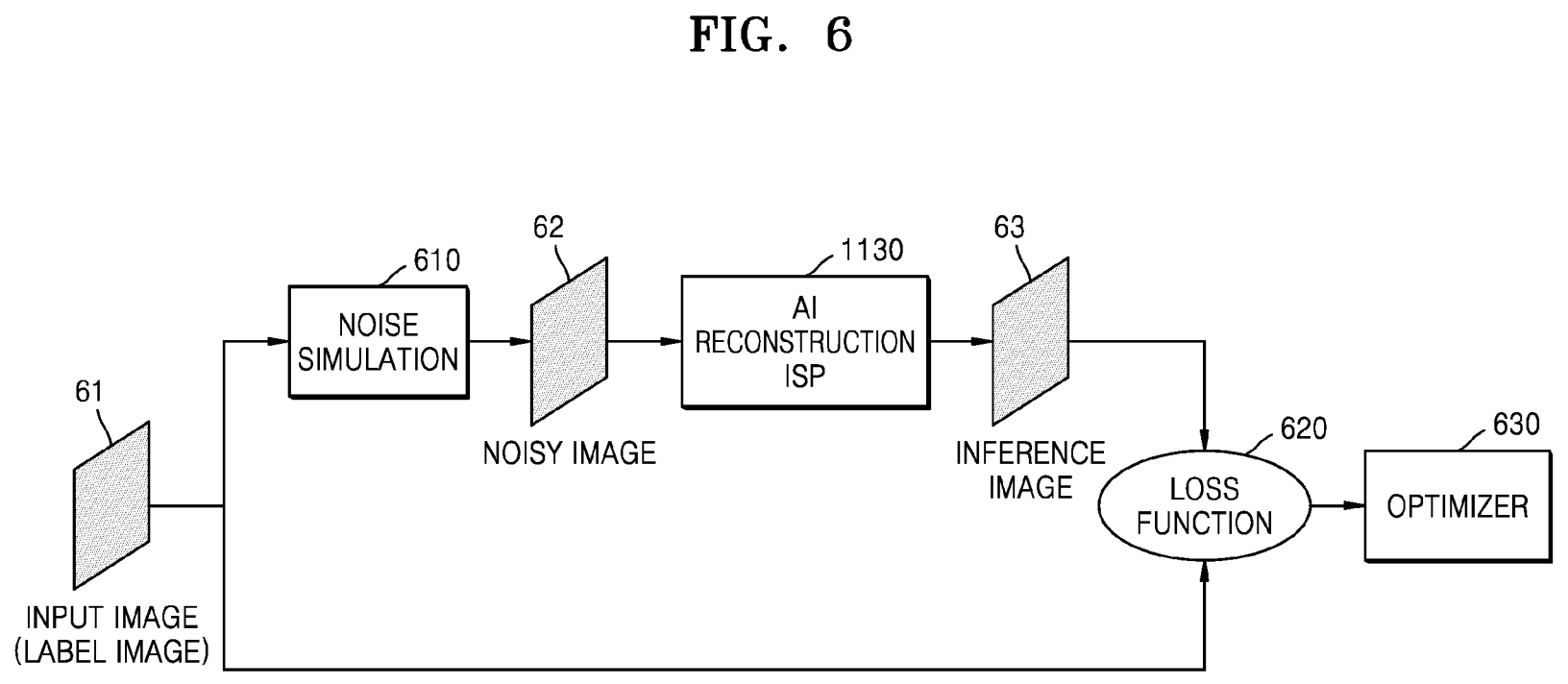

FIG. 6 is a diagram for describing a method of training a neural network model included in an image reconstruction module, according to an embodiment of the disclosure. Referring to FIG. 6, a noisy image 62 obtained by performing a noise simulation 610 on an input image 61 is input to the AI reconstruction ISP 1130, and the AI reconstruction ISP 1130 may output an inference image 63 from the noise image 62. In this case, the input image 61 is a label image to be compared with the inference image 63 and may correspond to ground truth data. The noise simulation 610 refers to an operation of generating the noisy image 62 by adding noise to the input image 61.

A method of generating training data by performing the noise simulation 610 on the input image 61 is described. The input image 61 may be a clean image containing almost no noise, and the noisy image 62 having noise added thereto may be obtained by performing the noise simulation 610 on various input images 61 stored in a database while varying the noise intensity. Because the input image 61 can be used as the label image as described above, a pair of the input image 61 and the noisy image 62 may be training data.

According to an embodiment of the disclosure, training data may be generated in advance by performing the noise simulation 610 on all the input images 61 stored in the database. Alternatively, according to an embodiment of the disclosure, training data may be generated by performing the noise simulation 610 while adjusting the noise intensity each time the training data is needed in the training process ("on-the-fly" method).

When generating training data for training the daytime model, the noisy image 62 may be generated by adding noise having an intensity corresponding to a daytime model to the input image 61 through the noise simulation 610. For example, in the embodiment of the disclosure described above with reference to Table 1, the noisy image 62 may be generated by adding shot noise of less than 0.001 to the input image 61 through the noise simulation 610.

Similarly, when generating training data for training a nighttime model, the noisy image 62 may be generated by adding noise having an intensity corresponding to the nighttime model to the input image 61 through the noise simulation 610. For example, in the case of the embodiment of the disclosure described above with reference to Table 1, the noisy image 62 may be generated by adding shot noise of 0.001 or more to the input image 61 through the noise simulation 610.

An optimizer 630 may update model parameters of the AI reconstruction ISP 1130 to minimize a result output when the inference image 63 and the input image 61 are input to a loss function 620. Therefore, the AI reconstruction ISP 1130 may be trained to infer an image that is as close as possible to a denoised image when an image with added noise is input.

The noise simulation 610, calculation of the loss function 620, and parameter update by the optimizer 630 may be performed by a processor of a computing apparatus responsible for training the AI reconstruction ISP 1130.

3. Selection of Neural Network Model in Image Correction Module

According to an embodiment of the present disclosure, a neural network model of the image correction module 1200 may be selected according to a process performed by the image reconstruction module 1100. For example, when the image reconstruction module 1100 includes a plurality of detailed components and a process performed by each detailed component is different, a neural network of the image correction module 1200 may be selected according to a detailed component selected in the image reconstruction module 1100.

Figure 7:
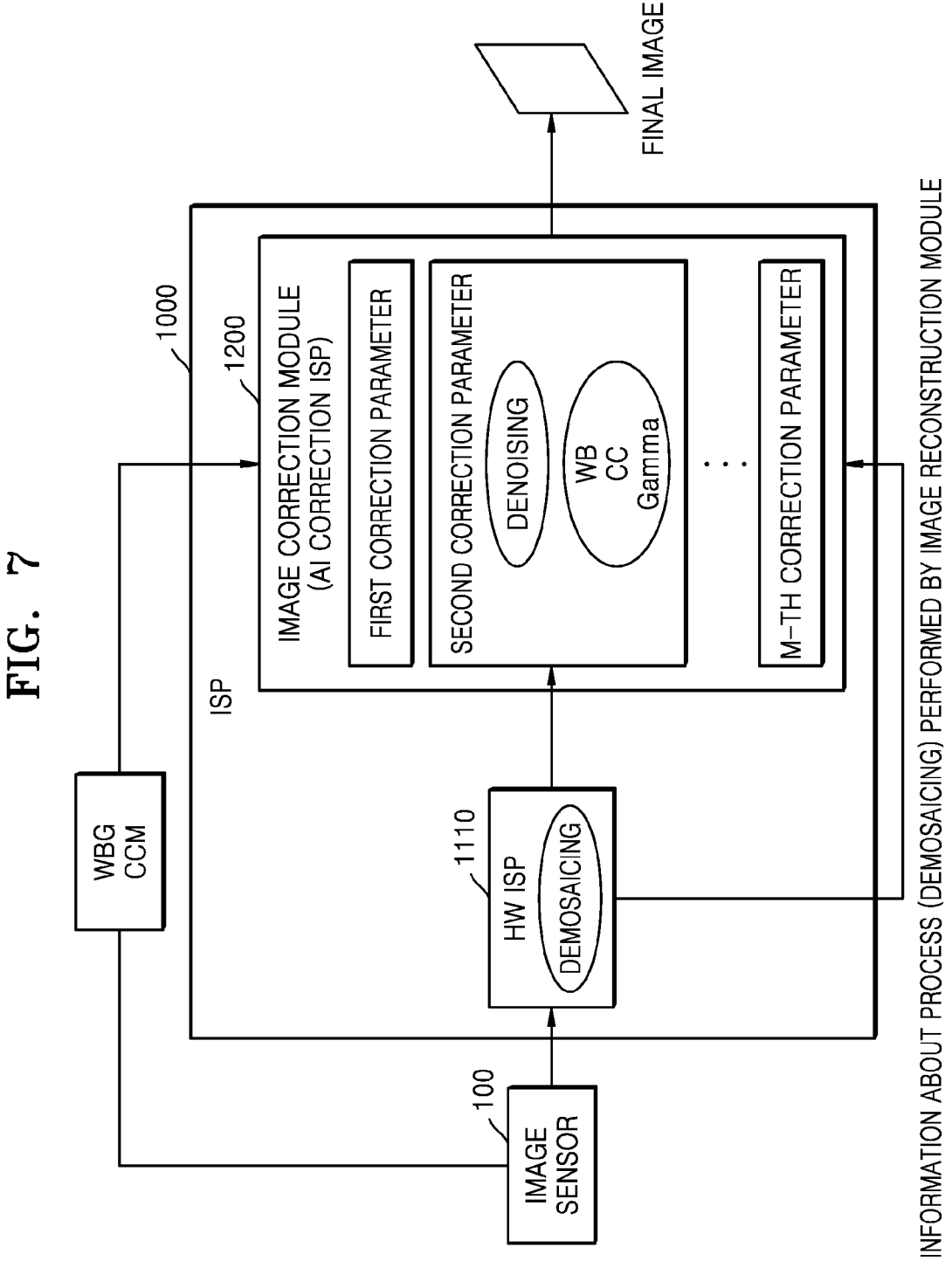
FIG. 7 is a diagram for describing a method of selecting a neural network model included in an image correction module in accordance with a process performed by an image reconstruction module, according to an embodiment of the disclosure.

FIG. 7 is a diagram for describing a method of selecting a neural network model included in an image correction module in accordance with a process performed by an image reconstruction module, according to an embodiment of the disclosure. Referring to FIG. 7, the HW ISP 1110 of the image reconstruction module 1100 is selected. It is assumed that the HW ISP 1110 performs demosaicing during a reconstruction process, but not denoising.

The HW ISP 1110 may transmit information about a process performed by the HW ISP 1110 itself (information indicating that demosaicing has been performed but denoising has not been performed) to the image correction module 1200. The image correction module 1200 may determine that denoising has not been performed in an image reconstruction operation based on the information received from the HW ISP 1110, and therefore select a second correction parameter supporting a denoising function to set a neural network model. In this case, the second correction parameter may be a neural network model pre-trained to correspond to the HW ISP 1110. In other words, to correct an image on which denoising is not performed, the second correction parameter may be a neural network model trained to perform denoising as well as white balance adjustment, color correction, and gamma value adjustment.

As shown in FIG. 7, the second correction parameter may also perform white balance adjustment, color correction, and gamma value adjustment by using a WBG and a CCM received from the image sensor 100.

When the SW ISP 1120 is selected in the image reconstruction module 1100 and performs demosaicing and denoising, a neural network model (a model parameter) trained to correspond to the SW ISP 1120 may be selected in the image correction module 1200, and in this case, the selected neural network model may not perform denoising but only perform white balance adjustment, color correction, gamma value adjustment, etc. That is, a neural network model may be selected in the image correction module 1200 according to which process is performed by the image reconstruction module 1100.

As described above, according to an embodiment of the disclosure, neural network models (model parameters) included in the image correction module 1200 may be pre-trained to respectively correspond to detailed components of the image reconstruction module 1100, and when a detailed component of the image reconstruction module 1100 is selected, a neural network model trained to correspond to the selected detailed component may be selected in the image correction module 1200. Furthermore, to this end, the image correction module 1200 may receive, from the image reconstruction module 1100, information about a process performed by the image reconstruction module 1100.

The method of selecting a neural network model from the AI reconstruction ISP 1130 based on a shooting condition and the method of selecting a neural network model from the image correction module 1200 according to a process performed by the image reconstruction module 1100 have been described above.

Hereinafter, based on the above descriptions, an embodiment in which the type of image sensor and detailed components of an image reconstruction module and an image correction module are selected according to a shooting context is described first, and a method of training a neural network model included in the image correction module is then described.

Figure 8:
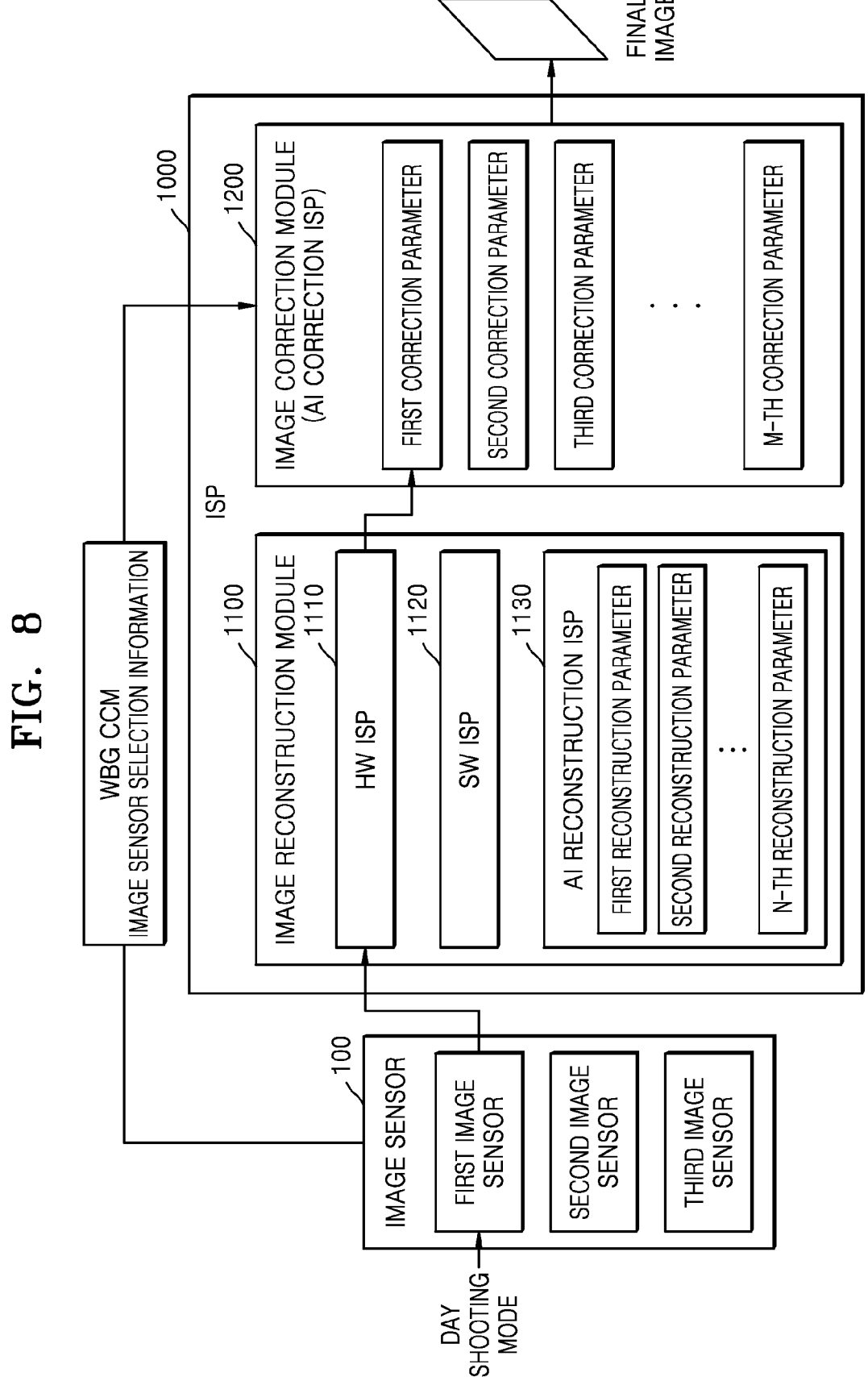
FIGS. 8 to 10 are diagrams for describing a method of selecting an image sensor, an image reconstruction module, and an image correction module according to a shooting context, according to an embodiment of the disclosure.
Figure 9:
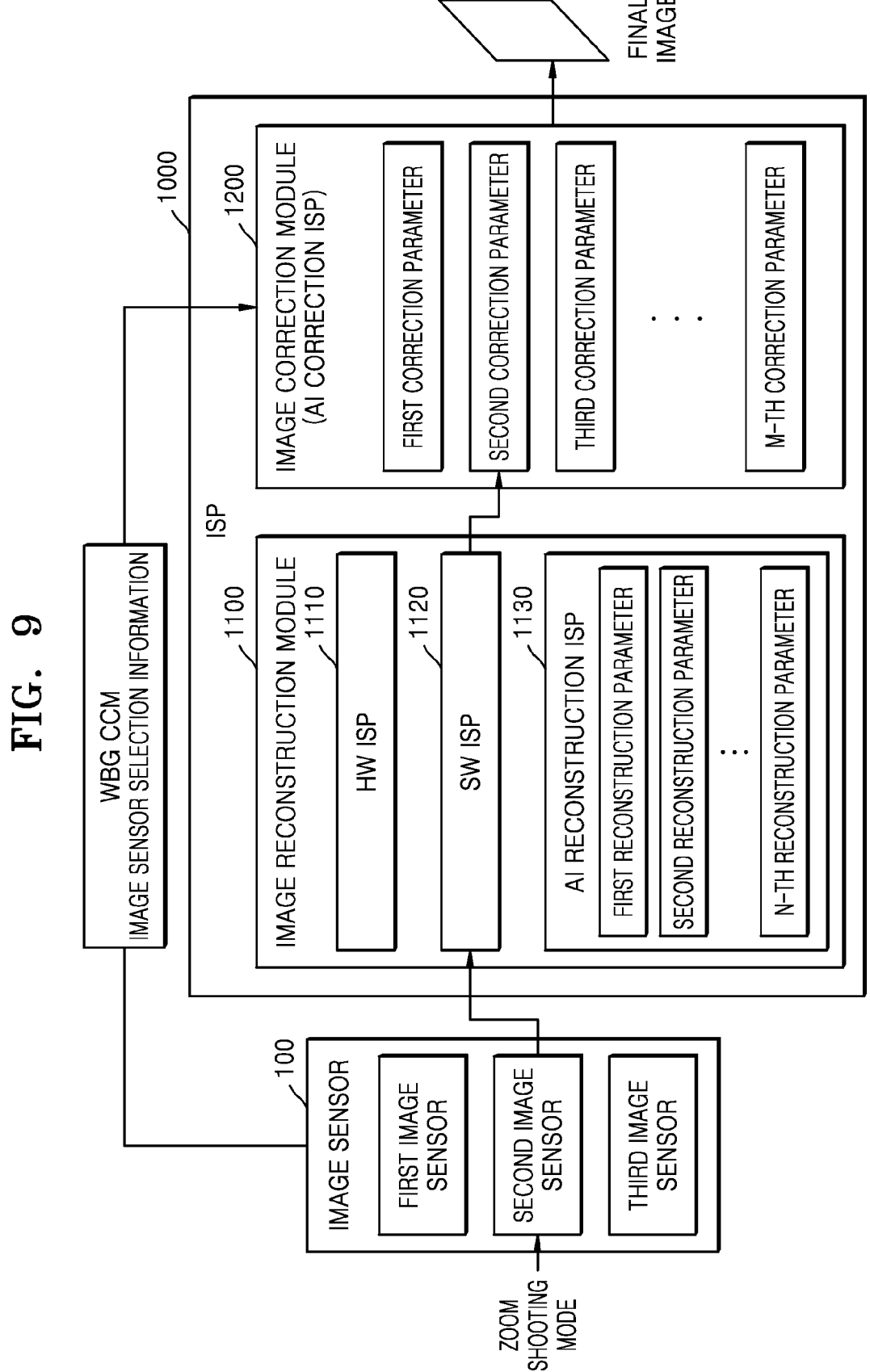
Figure 10:
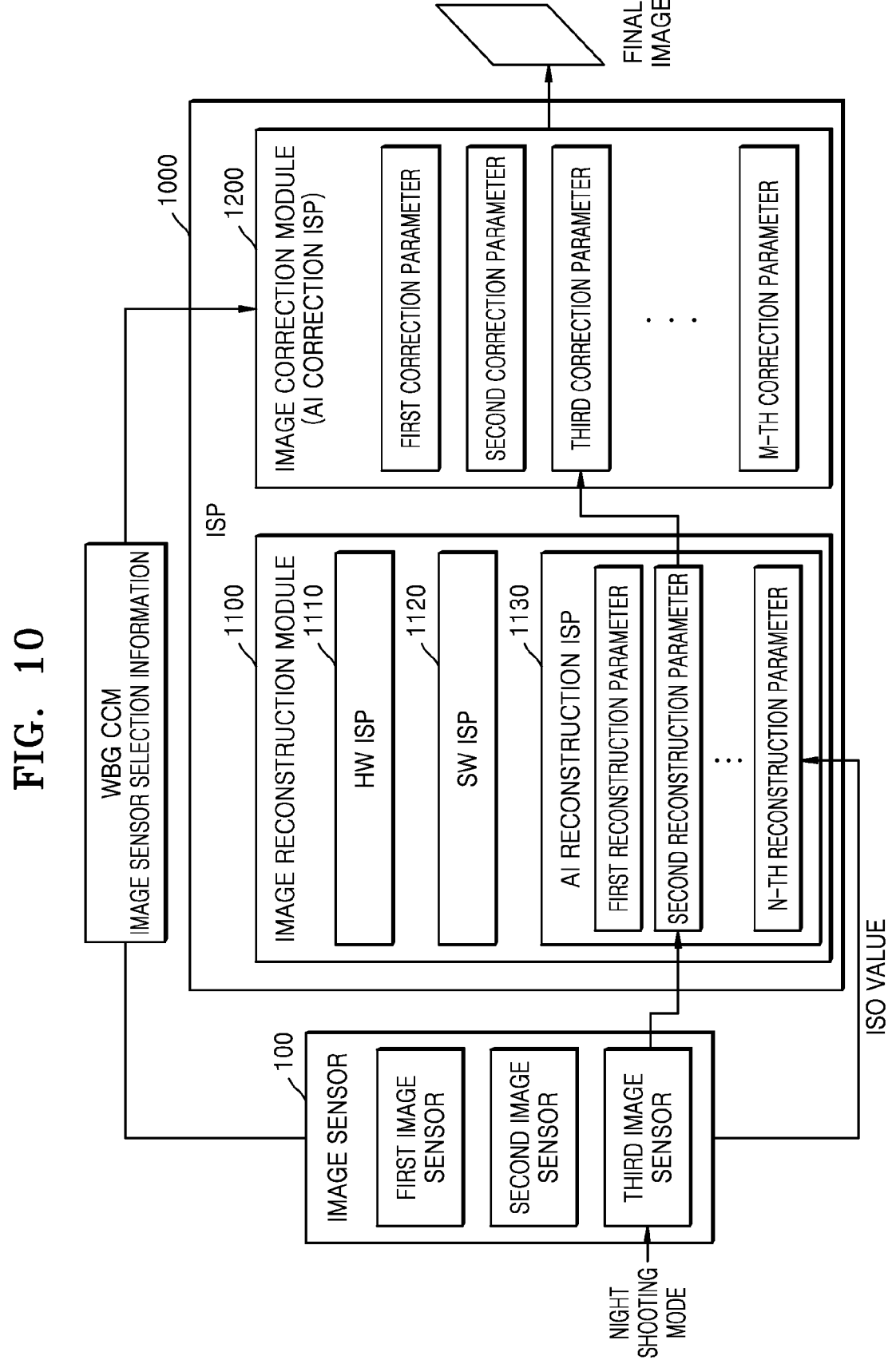

4. Selection of Image Sensor, Image Reconstruction Module and Image Correction Module According to Shooting Context According to an embodiment of the disclosure, the type of image sensor and detailed components of the image reconstruction module and the image correction module may be selected according to a shooting context (a shooting condition and a shooting mode). FIGS. 8 to 10 are diagrams for describing methods of selecting an image sensor, an image reconstruction module, and an image correction module according to a shooting context, according to an embodiment of the disclosure. As shown in FIGS. 8 to 10, it is assumed that an image sensor 100 includes a plurality of image sensors. It is also assumed that a shooting mode includes a day shooting mode (normal shooting mode) (FIG. 8), a zoom shooting mode (FIG. 9), and a night shooting mode (FIG. 10).

According to an embodiment of the disclosure, the shooting mode may be set by a user via a user interface (UI) of a computing apparatus (e.g., the user terminal 3000 of FIG. 3) that performs image signal processing. For example, the user may execute a camera application on the user terminal 3000 and select an appropriate shooting mode depending on the situation before shooting. When the shooting mode is set, the user terminal 3000 may select the type of image sensor 100 and detailed components of the image reconstruction module 1100 and the image correction module 1200 accordingly.

(1) Selection of Image Sensor

According to an embodiment of the present disclosure, a type of image sensor 100 may be selected based on a shooting mode. For example, the image sensor 100 may include a general image sensor, a wide-angle image sensor, and an ultra-wide-angle image sensor, which may be each matched with a corresponding shooting mode as needed.

In an embodiment of FIGS. 8 to 10, it is assumed that a first image sensor is matched with a day shooting mode, a second image sensor is matched with a zoom shooting mode, and a third image sensor is matched with a night shooting mode. As seen on FIGS. 8 to 10, a corresponding image sensor is selected according to each shooting mode.

Also, according to an embodiment of the disclosure, a type of the image sensor 100 may be selected based on a shooting condition. For example, when it is determined that an environment is a low-light environment based on a time when and a location where shooting is performed, the image sensor 100 suitable for nighttime shooting may be selected.

(2) Selection of Image Reconstruction Module

According to an embodiment of the disclosure, a detailed component of the image reconstruction module 1100 may be selected according to a shooting mode or a type of the image sensor 100 used when shooting an image. To this end, the detailed components of the image reconstruction module 1100 may be each matched to a corresponding shooting mode or type of the image sensor 100.

As seen on FIGS. 8 to 10, the HW ISP 1110 is selected when a shooting mode is a day shooting mode (when the first image sensor is selected), the SW ISP 1120 is selected when the shooting mode is a zoom shooting mode (when the second image sensor is selected), and the AI reconstruction ISP 1130 is selected when the shooting mode is a night shooting mode (when the third image sensor is selected).

Referring to FIG. 10, a second reconstruction parameter is selected from among a plurality of reconstruction parameters in the AI reconstruction ISP 1130, and as described above with reference to FIG. 5, the second reconstruction parameter may be selected from among the plurality of reconstruction parameters based on a shooting condition (e.g., an ISO value included in metadata of an image captured by the third image sensor).

Furthermore, according to an embodiment of the disclosure, not only a shooting mode or type of the image sensor 100 but also a shooting condition may be further considered when selecting a detailed component of the image reconstruction module 1100. For example, in the embodiment of the disclosure shown in FIG. 8, when the first image sensor is selected due to the day shooting mode, the HW ISP 1110 may be selected in the image reconstruction module 1100, and even in this case, either the SW ISP 1120 or the AI reconstruction ISP 1130 may be selected when an ISO value is higher than or equal to a certain reference value.

Furthermore, according to an embodiment of the disclosure, a detailed component of the image reconstruction module 1100 may be selected based on only a shooting condition. For example, a detailed component corresponding to each range of an ISO value may be determined in advance, and the image reconstruction module 1100 may select a detailed component according to an ISO value obtained from metadata of an image.

That is, a detailed component of the image reconstruction module 1100 may be selected based on at least one of a type of the image sensor 100, a shooting mode, or a shooting condition. In particular, when the type of the image sensor 100 is selected according to the shooting context (the shooting mode and the shooting condition), a detailed component of the image reconstruction module 1100 may be selected accordingly.

(3) Selection of Image Correction Module

As described above with reference to FIG. 7, according to an embodiment of the disclosure, a neural network model of the image correction module 1200 may be selected according to a process performed by the image reconstruction module 1100. However, a process performed by the image reconstruction module 1100 may be determined according to which detailed component is selected in the image reconstruction module 1100, and a detailed component of the image reconstruction module 1100 may be selected based on at least one of a type of the image sensor 100, a shooting mode, or a shooting condition. Therefore, in other words, a neural network model of the image reconstruction module

1100 may also be selected based on at least one of a type of the image sensor 100, a shooting mode, or a shooting condition.

According to an embodiment of the present disclosure, a neural network model of the image correction module 1200 corresponding to each combination of the image sensor 100 and the image reconstruction module 1100 may exist. Therefore, according to an embodiment of the disclosure, when a shooting mode is determined, a type of the image sensor 100 and a detailed configuration of the image reconstruction module 1100 may be selected according to the shooting mode, and one of a plurality of neural network models included in the image correction module 1200 may be selected according to a combination of the selected image sensor 100 and image reconstruction module 1100. Furthermore, according to an embodiment of the disclosure, when selecting the image sensor 100, the image reconstruction module 1100, and the image correction module 1200, a shooting condition (e.g., an ISO value) may be considered together.

According to an embodiment of the disclosure, because the image correction module 1200 may reflect the type of the image sensor 100 when selecting a neural network model, the image correction module 1200 may obtain image sensor selection information (information about which image sensor has been selected).

Moreover, the image correction module 1200 may obtain a WBG and a CCM from the image sensor 100 and perform white balance adjustment, color correction, gamma value adjustment, etc. by using the WBG and the CCM.

Referring to FIG. 8, when the shooting mode is a day shooting mode, the first image sensor may be selected in the image sensor 100, and the HW ISP 1110 corresponding to the first image sensor may be selected in the image reconstruction module 1100. According to an embodiment of the disclosure, a shooting condition may also be considered when selecting a detailed component of the image reconstruction module 1100, and for example, even when the shooting mode is the day shooting mode and the first image sensor is selected, either the SW ISP 1120 or the AI reconstruction ISP 1130 may be selected instead of the HW ISP 1110 when the ISO value is higher than or equal to a certain reference value.

A first correction parameter corresponding to the HW ISP 1110 may be selected by the image correction module 1200. In this case, the first correction parameter may be a neural network model trained to correspond to the HW ISP 1110. For example, when the HW ISP 1110 performs only demosaicing but does not perform denoising, the first correction parameter may be a neural network model trained to perform white balance adjustment, color correction, and gamma value adjustment, as well as denoising.

Moreover, as described above, the type of image sensor 100 may be considered when selecting a neural network model in the image correction module 1200, and for example, when the same HW ISP 1110 is selected in the image reconstruction module 1100, but the second or third image sensor is selected in the image sensor 100, a correction parameter other than the first correction parameter may be selected in the image correction module 1200. Accordingly, neural network models included in the image correction module 1200 may be each trained to correspond to a combination of the image sensor 100 and the image reconstruction module 1100. In addition, the neural network models included in the image correction module 1200 may be each trained to correspond to a shooting context.

Referring to FIG. 9, when the shooting mode is the zoom shooting mode, the second image sensor may be selected in the image sensor 100, and the SW ISP 1120 corresponding to the second image sensor may be selected in the image reconstruction module 1100. According to an embodiment of the disclosure, the second image sensor is an image sensor capable of capturing multiple frames and may be matched with a wide-angle lens, and a plurality of frames obtained via the second image sensor may be easily synthesized and enlarged.

According to an embodiment of the disclosure, when the second image sensor transmits an image physically enlarged by a certain magnification factor in a zoom shooting mode to the SW ISP 1120, the SW ISP 1120 may perform a center crop on the received image and then enlarge the cropped region by a certain magnification factor by using an algorithm. In addition, the SW ISP 1120 may output a linear RGB image by further performing demosaicing and super resolution (SR).

According to an embodiment of the disclosure, a shooting condition may also be taken into account when selecting a detailed component of the image reconstruction module 1100, and for example, even in a case where the shooting mode is the zoom shooting mode and the second image sensor is selected, the AI reconstruction ISP 1130 may be selected instead of the SW ISP 1120 when the ISO value is higher than or equal to a certain reference value. Also, a neural network model (a reconstruction parameter) may be selected according to an ISO value even within the AI reconstruction ISP 1130.

A second correction parameter corresponding to the SW ISP 1110 may be selected by the image correction module 1200. In this case, the second correction parameter may be a neural network model trained to correspond to the zoom shooting mode and the SW ISP 1120. For example, the second correction parameter may be a neural network model pre-trained to correct an image to have image characteristics suitable for an enlarged image. In this case, "image characteristics suitable for an enlarged image" may not be determined uniformly, but may be preset by a user or administrator according to objective statistical data, an individual's or group's preferences, or the like. Also, for example, the second correction parameter may be a neural network model trained to correct image characteristics (e.g., to increase contrast) so that an object in a final image appears as distinct and clear as possible.

In addition, according to an embodiment of the disclosure, because the SW ISP 1120 corresponding to the zoom shooting mode performs a center crop, demosaicing, and super resolution (but not denoising), the second correction parameter may be a neural network model trained to accordingly perform WB adjustment, color correction, and gamma value adjustment, as well as denoising.

Moreover, as described above, the type of image sensor 100 may be considered when selecting a neural network model in the image correction module 1200, and for example, when the same SW ISP 1110 is selected in the image reconstruction module 1100, but the first or third image sensor is selected in the image sensor 100, a correction parameter other than the second correction parameter may be selected in the image correction module 1200. Accordingly, neural network models included in the image correction module 1200 may be each trained to correspond to a combination of the image sensor 100 and the image reconstruction module 1100. In addition, the neural network models included in the image correction module 1200 may be each trained to correspond to a shooting context.

Referring to FIG. 10, when the shooting mode is the night shooting mode, the third image sensor may be selected in the image sensor 100, and the AI reconstruction ISP 1130 corresponding to the third image sensor may be selected in the image reconstruction module 1100. According to an embodiment of the disclosure, the third image sensor may be an image sensor matched with a wide-angle lens. As described above with reference to FIG. 5, one neural network (the second reconstruction parameter) may be selected from among the plurality of neural network models (reconstruction parameters) in the AI reconstruction ISP 1130 based on an ISO value. Also, the second reconstruction parameter selected by the AI reconstruction ISP 1130 may perform denoising with an intensity determined based on the ISO value.

According to an embodiment of the disclosure, a shooting condition may also be considered when selecting a detailed component of the image reconstruction module 1100, and for example, even when the shooting mode is the night shooting mode and the third image sensor is selected, either the SW ISP 1120 or the HW ISP 1110 may be selected instead of the AI reconstruction ISP 1130 when the ISO value is lower than a certain reference value.

A third correction parameter corresponding to the second reconstruction parameter of the AI reconstruction ISP 1130 may be selected by the image correction module 1200. In this case, the third correction parameter may be a neural network model trained to correspond to the second reconstruction parameter of the AI reconstruction ISP 1130. For example, the third correction parameter may be a neural network model trained to correct image characteristics (e.g., to increase the brightness of a particular region) to maximally increase a brightness of a dark area.

In addition, according to an embodiment of the disclosure, when the second reconstruction parameter of the AI reconstruction ISP 1130 performs demosaicing and denoising, the third correction parameter may be a neural network model trained to perform white balance adjustment, color correction, gamma value adjustment, etc. without performing denoising.

Moreover, as described above, the type of image sensor 100 may be considered when selecting a neural network model in the image correction module 1200, and for example, when the same AI reconstruction ISP 1130 is selected in the image reconstruction module 1100, but the second or third image sensor is selected in the image sensor 100, a correction parameter other than the third correction parameter may be selected in the image correction module 1200. Accordingly, neural network models included in the image correction module 1200 may be each trained to correspond to a combination of the image sensor 100 and the image reconstruction module 1100. In addition, the neural network models included in the image correction module 1200 may be each trained to correspond to a shooting context.

As described above, a neural network model of the image correction module 1200 may be selected based on at least one of a type of the image sensor 100, a shooting mode, and a shooting condition. In particular, when a type of image sensor 100 and a detailed component of the image reconstruction module 1100 are selected according to a shooting context (a shooting mode and a shooting condition), a neural network model of the image correction module 1200 may be selected accordingly.

Furthermore, according to an embodiment of the disclosure, a neural network model of the image correction module 1200 may be selected to correspond to each shooting mode, and the selected neural network model may be pre-trained in a direction to appropriately correct image characteristics according to a corresponding shooting mode. In this case, the "direction to appropriately correct image characteristics according to each shooting mode" may be preset by a user or administrator according to objective statistical data, an individual's or group's preferences, or the like.

A process according to an embodiment of the disclosure described above is described below with reference to flow-charts. FIGS. 11 to 14 are flowcharts for describing methods of processing an image signal by using a neural network model, according to an embodiment of the disclosure.

Figure 11:
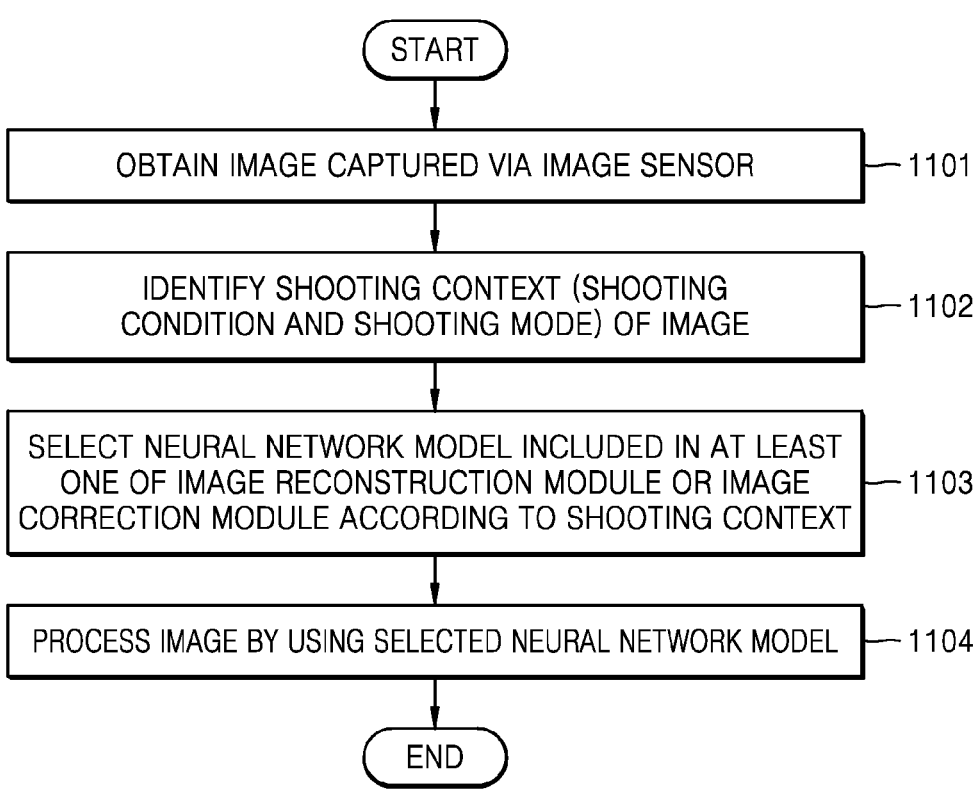
FIGS. 11 to 14 are flowcharts for describing a method of processing an image signal by using a neural network model, according to an embodiment of the disclosure.

Referring to FIG. 11, in operation 1101, a computing apparatus (e.g., the user terminal 3000 of FIG. 3) may obtain an image captured via an image sensor. In this case, a type of the image sensor may be selected from among a plurality of different types of image sensors based on at least one of a shooting condition or a shooting mode.

In operation 1102, the computing apparatus may identify a shooting context (a shooting condition and a shooting mode) of the image. According to an embodiment of the disclosure, the computing apparatus may obtain, from meta-data of the image, a shooting condition such as a time when and a location where the image is captured, an ISO value of the image, etc. When the computing apparatus includes an image sensor, i.e., when an image is captured via the computing apparatus, the computing apparatus may directly identify a shooting mode set during shooting. Alternatively, when the computing apparatus does not include an image sensor and receives a captured image to only perform image signal processing, the computing apparatus may identify a shooting mode from metadata of the received image.

According to an embodiment of the disclosure, the shooting context may include at least one of a shooting condition or a shooting mode. The shooting condition may include at least one of an ISO value of the image, a time when the image is captured, or a location where the image is captured. The shooting mode may include at least one of a normal shooting mode, a night shooting mode, or a zoom shooting mode.

In operation 1103, the computing apparatus may select a neural network model included in at least one of an image reconstruction module or an image correction module according to the shooting context. Detailed operations included in operation 1103 are illustrated in FIG. 12.

Figure 12:
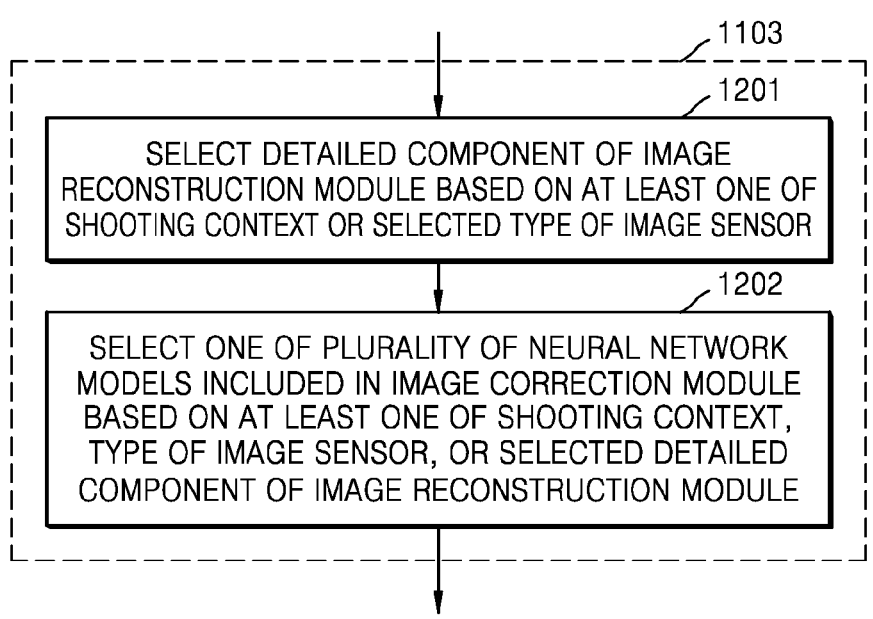

Referring to FIG. 12, in operation 1201, the computing apparatus may select a detailed component of an image reconstruction module based on at least one of the shooting context or the selected type of image sensor. Detailed operations included in operation 1201 are illustrated in FIG. 13.

Figure 13:
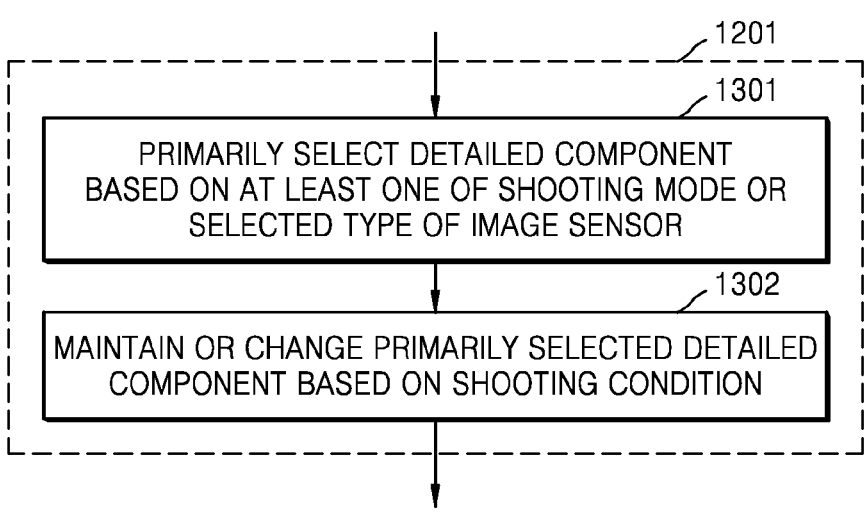

Referring to FIG. 13, in operation 1301, the computing apparatus may primarily select a detailed component of an image reconstruction module based on at least one of the shooting mode or the selected type of image sensor.

In operation 1302, the computing apparatus may maintain or change the primarily selected detailed component of the image reconstruction module based on the shooting condition. For example, when the primarily selected detailed component needs to be changed by taking into account an ISO value included in the shooting condition, the computing apparatus may select a new detailed component of the image reconstruction module based on the ISO value. According to an embodiment of the disclosure, a detailed component of the image reconstruction module, which corresponds to the shooting mode or the type of image sensor, may be designated in advance.

Referring back to FIG. 12, according to an embodiment of the disclosure, in selecting the detailed component of the image reconstruction module in operation 1201, the computing apparatus may select one of a plurality of neural network models included in the image reconstruction module based on the ISO value included in the shooting condition. In this case, the neural network model selected in the image reconstruction module may include a denoising function and may be a neural network model trained by using images containing noise corresponding to the ISO value included in the shooting condition.

In operation 1202, the computing apparatus may select one of a plurality of neural network models included in the image correction module based on at least one of the shooting context, the selected type of image sensor, or the selected detailed component of the image reconstruction module. According to an embodiment of the disclosure, the computing apparatus may select a neural network model corresponding to a combination of the selected type of image sensor and the selected detailed component of the image reconstruction module. In this case, the selected neural network model may be a neural network model trained to correct image characteristics according to the shooting context in which the image is captured.

Referring back to FIG. 11, in operation 1104, the computing apparatus may process the image by using the selected neural network model.

Figure 14:
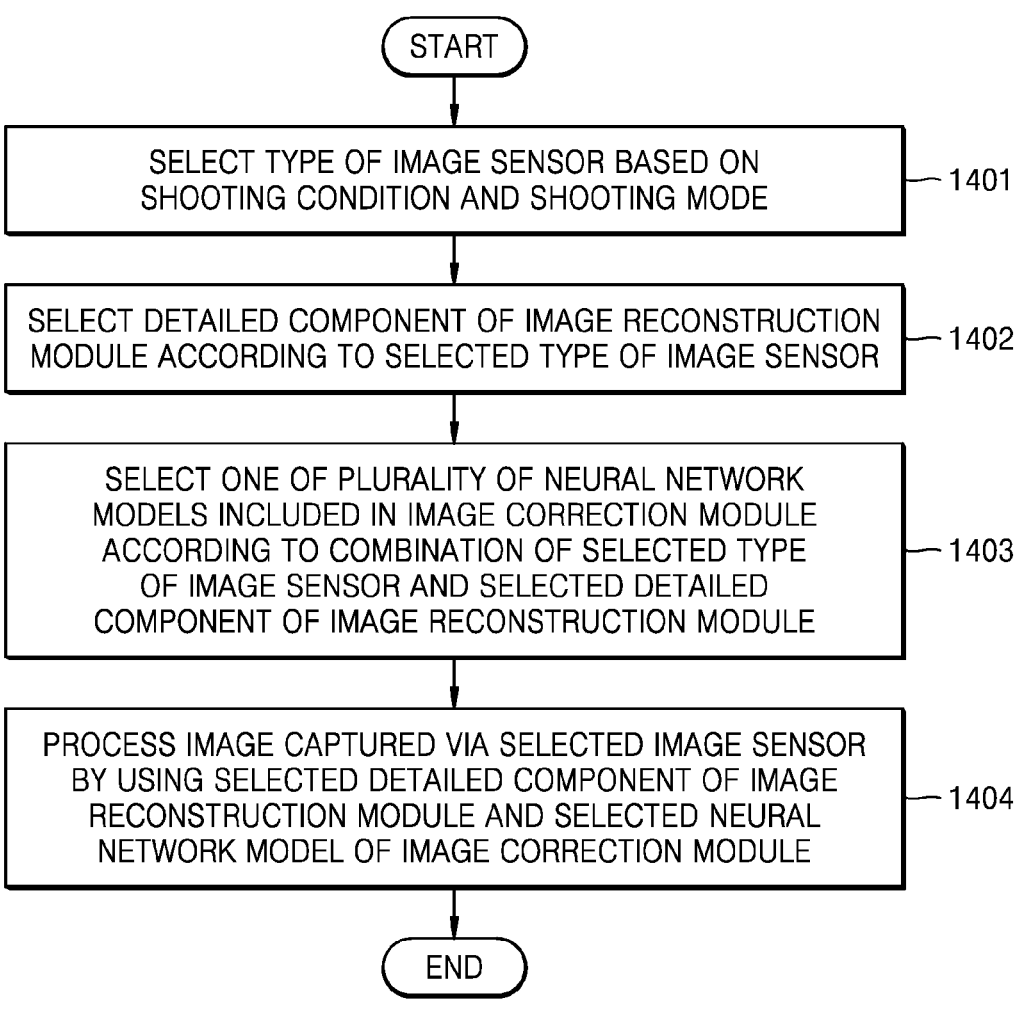

FIG. 14 is a flowchart for describing a method of sequentially selecting a type of an image sensor, a detailed component of an image reconstruction module, and a neural network model of an image correction module according to a shooting context, according to an embodiment of the disclosure.

Referring to FIG. 14, in operation 1401, the computing apparatus may select a type of image sensor based on a shooting condition and a shooting mode. According to an embodiment of the disclosure, a type of image sensor corresponding to each combination of a shooting condition and a shooting mode may be predetermined. Alternatively, according to an embodiment of the disclosure, a type of image sensor corresponding to each shooting mode may be predetermined. Alternatively, according to an embodiment of the disclosure, because a type of image sensor corresponding to each shooting mode is predetermined, the computing apparatus may basically select a type of image sensor according to a shooting mode, but when the shooting condition satisfies a particular criterion, the computing apparatus may also select another image sensor.

In operation 1402, the computing apparatus may select a detailed component of an image reconstruction module according to the selected type of image sensor. To achieve this, a detailed component of an image reconstruction module corresponding to each type of image sensor may be predetermined. For example, when the selected image sensor is an image sensor for performing zoom shooting, a detailed component for performing a center crop and magnification may be selected in the image reconstruction module.

In operation 1403, the computing apparatus may select one of a plurality of neural network models included in an image correction module according to a combination of the selected type of image sensor and the selected detailed component of the image reconstruction module. In this case, the selected neural network model may be a neural network model trained to correct image characteristics according to a shooting context corresponding to the combination of the selected type of image sensor and the selected detailed component of the image reconstruction module. For example, when the shooting context corresponding to the combination of the selected type of image sensor and the selected detailed component of the image reconstruction module corresponds to a case where shooting is performed in a zoom shooting mode in low light, the neural network model selected in the image correction module may be a neural network model trained to increase brightness and contrast.

In operation 1404, the computing apparatus may process an image captured via the selected image sensor by using the selected detailed component of the image reconstruction module and the selected neural network model of the image correction module.

4. Applied Embodiment—Selection of image sensor, image reconstruction module and image correction module by reflecting object recognition result.

Hereinafter, as a specific embodiment of the disclosure, a method of changing a combination of an image sensor, an image reconstruction module, and an image correction module according to an object recognition result when shooting in an object recognition mode (e.g., an AI camera mode in which an object is recognized) is described with reference to FIG. 15.

Figure 15:
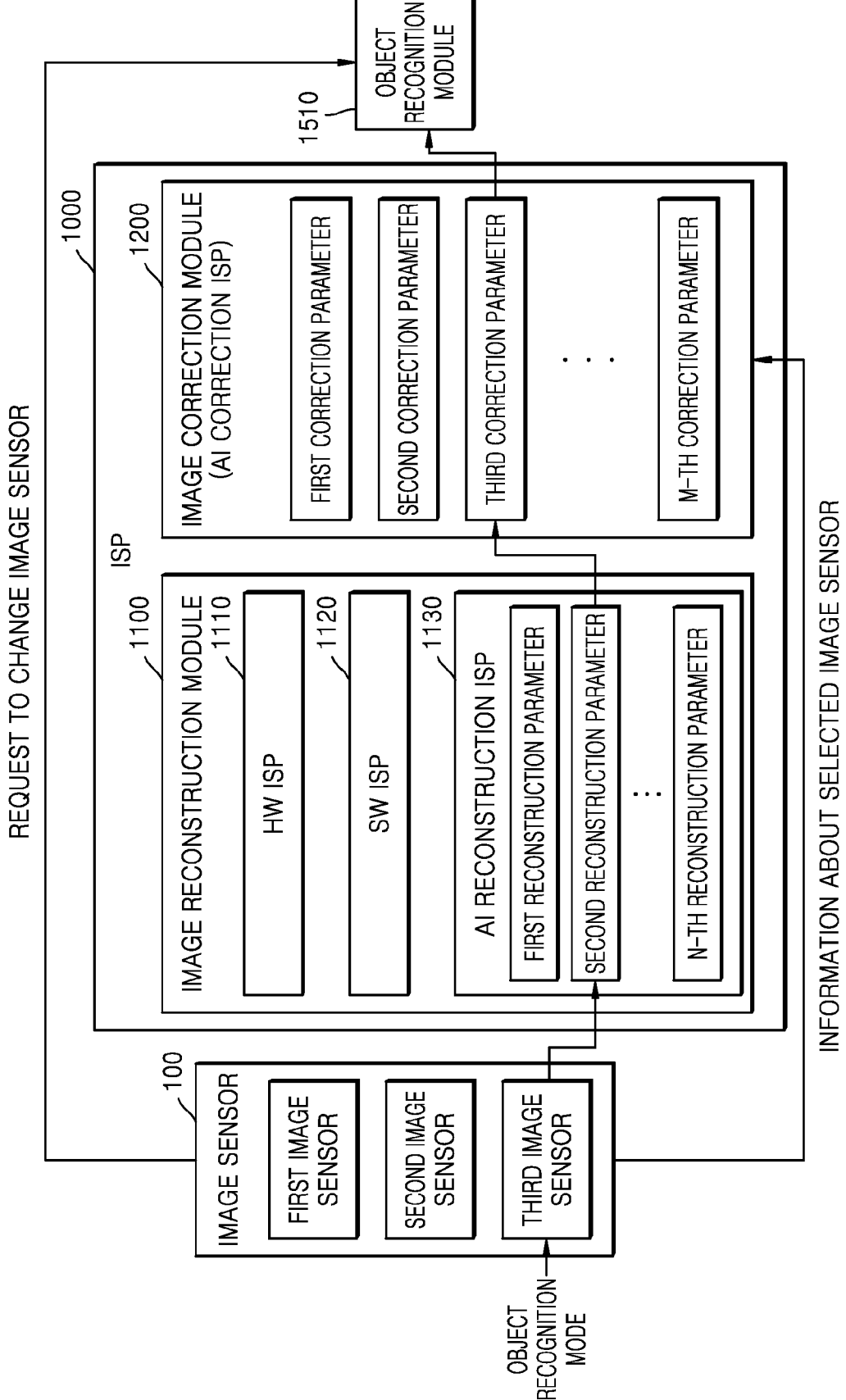
FIG. 15 is a diagram for describing a method of changing a combination of an image sensor, an image reconstruction module, and an image correction module according to a type of an object recognized in an image, according to an embodiment of the disclosure.

Referring to FIG. 15, an image may be captured by the third image sensor according to an object recognition mode, and the captured image may be processed by the AI reconstruction ISP 1130 of the image reconstruction module 1100. In the embodiment of the disclosure of FIG. 15, the AI reconstruction ISP 1130 processes an image signal in a state where it is set with a second reconstruction parameter, and the second reconstruction parameter may be selected based on a shooting mode (an object recognition mode) and a shooting condition (e.g., an ISO value).

In the embodiment of the disclosure of FIG. 15, the third correction parameter corresponding to a combination of the first image sensor and the second reconstruction parameter is selected in the image correction module 1200. According to an embodiment of the disclosure, the third correction parameter may be a neural network model trained to correct image characteristics in a direction to increase object recognition accuracy.

An object recognition module 1510 may recognize an object in an image output by the image correction module 1200. According to an embodiment of the disclosure, the object recognition module 1510 may request a change of the image sensor 100 based on an object recognition result. Furthermore, according to an embodiment of the disclosure, the object recognition module 1510 may recommend another shooting mode to the user or automatically change the shooting mode, based on the object recognition result.

For example, when the moon is recognized as a result of performing object recognition, the object recognition module 1510 may request the image sensor 100 to change to an image sensor matched with a wide-angle lens, recommend a change to a wide-angle shooting mode to the user, or automatically change the shooting mode to the wide-angle shooting mode.

When the type of the image sensor 100 or the shooting mode is changed according to the object recognition result, a detailed component of the image reconstruction module 1100 and a neural network model of the image correction module 1200 may also be changed accordingly.

In this way, when the type of the image sensor 100, the detailed component of the image reconstruction module 1100, and the neural network model of the image correction module 1200 are changed according to the object recognition result, the image signal may be processed again according to the changed settings to output a final image.

In the embodiment of the disclosure shown in FIG. 15, the object recognition module 1510 recognizes an object from the image output from the image correction module 1200, but the object recognition module 1510 may perform object recognition at another location. For example, the object recognition module 1510 may recognize an object in an image output from the image sensor 100 or in an image output from the image reconstruction module 1100.

5. Training of Neural Network Model Included in Image Correction Module

As described above, neural network models included in the image correction module 1200 may be trained by setting a direction of correction of image characteristics differently for each shooting context (e.g., increasing contrast in a zoom mode, increasing brightness in night shooting mode, etc.), and hereinafter, a method of training a neural network model included in the image correction module 1200 is described with reference to FIGS. 16 to 33.

In the following embodiment of the disclosure, it is assumed that the neural network models included in the image correction module 1200 each include two neural network models (a first neural network model and a second neural network model). In other words, each correction parameter included in the image correction module 1200 includes both parameters for setting the first neural network model and parameters for setting the second neural network model.

According to an embodiment of the disclosure, each of the neural network models included in the image correction module 1200 may include the "first neural network model" that corrects an input image to output an inference image, and the "second neural network model" that infers an optimal correction parameter for a given input image.

(1) Description of Basic Operation of First Neural Network Model and Second Neural Network Model First, roles of a first neural network model 1210 and a second neural network model 1220 are briefly described with reference to FIGS. 16 and 17, and then a method of training the first neural network model 1210 and the second neural network model 1220 to perform the roles is described with reference to FIGS. 18 and 19.

Figure 16:
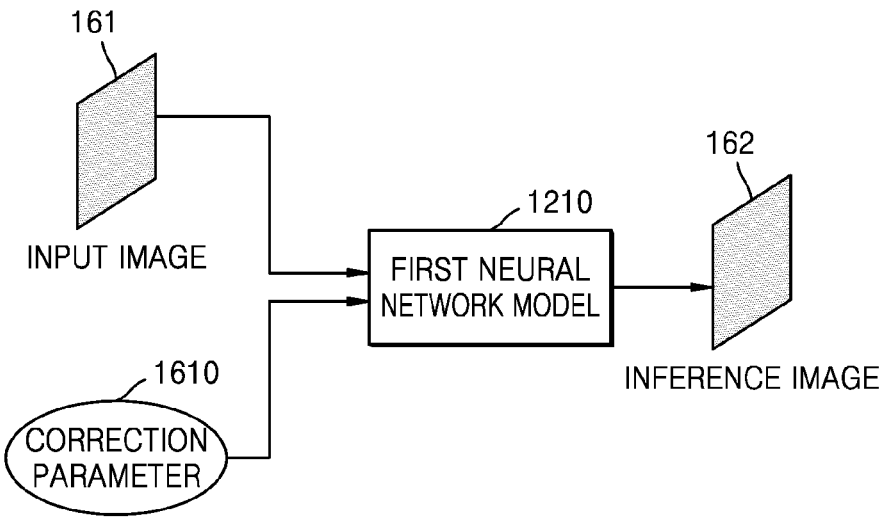
FIG. 16 is a diagram for describing an operation of a first neural network model according to an embodiment of the disclosure.

FIG. 16 is a diagram for describing an operation of the first neural network model 1210 according to an embodiment of the disclosure. Referring to FIG. 16, according to an embodiment of the disclosure, when receiving an input image 161 and a correction parameter 1610, the first neural network model 1210 may output an inference image 162 corresponding to the correction parameter 1610. In this case, the inference image 162 corresponds to an image obtained by correcting the input image 161 based on the correction parameter 1610. The manner in which the first neural network model 1210 is trained to output the inference image 162 is described in detail below with reference to FIG. 18.

In general, the input image 161 may have a drawback in that an object in the input image 161 is not well recognized because the entire or a part of the input image 161 is dark or has a low contrast. To solve this drawback, the first neural network model 1210 may serve to increase brightness or enhance contrast of the input image 161.

The first neural network model 1210 may output the inference image 162 as shown in FIG. 16, but output a filter or map information used to convert the input image 161 into the inference image 162 instead of outputting the inference image 162 itself. In other words, the input image 161 may be converted into the inference image 162 by using the filter or map information output from the first neural network model 1210.

The first neural network model 1210 may be implemented to include various types of deep learning networks, and for example, it may be implemented as a residual network (ResNet), which is a type of convolutional neural network (CNN), but is not limited thereto.

Figure 17:
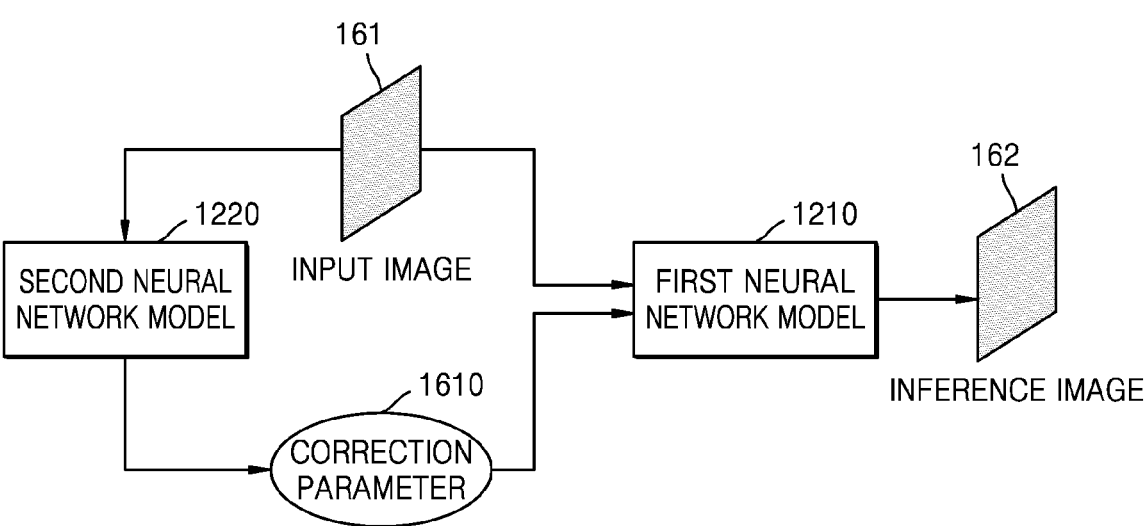
FIG. 17 is a diagram for describing an operation of a second neural network model according to an embodiment of the disclosure.

FIG. 17 is a diagram for describing an operation of the second neural network model 1220 according to an embodiment of the disclosure. Referring to FIG. 17, according to an embodiment of the disclosure, the second neural network model 1220 may receive the input image 161 to infer and output the correction parameter 1610. The correction parameter 1610 output from the second neural network model 1220 is input to the first neural network model 1210, and the first neural network model 1210 may output the inference image 162 corresponding to the correction parameter 1610 as described above with reference to FIG. 16.

The second neural network model 1220 may infer the correction parameter 1610 for correcting the input image 161 to have image characteristics that the user may find pleasing. In this case, a direction in which the input image 161 is corrected due to the correction parameter 1610 inferred by the second neural network model 1220 may be determined in the process of training the second neural network model 1220, and a detailed description thereof is provided below with reference to FIG. 19.

The second neural network model 1220 may also be implemented to include various types of deep learning networks, and for example, it may be implemented as a residual network (ResNet), which is a type of CNN, but is not limited thereto.

(2) (Training Process) Method of Training First Neural Network Model and Second Neural Network Model Hereinafter, a method of training the first neural network model 1210 and the second neural network model 1220 is described with reference to FIGS. 18 and 19.

According to an embodiment of the disclosure, training of the first and second neural network models 1210 and 1220 may be performed by an external apparatus (e.g., a computing apparatus 500 of FIG. 31) other than a device (e.g. the user terminal 3000 of FIG. 3) into which the first and second neural network models 1210 and 1220 are loaded. According to an embodiment of the disclosure, the device into which the first and second neural network models 1210 and 1220 are loaded may also train the first and second neural network models 1210 and 1220. Hereinafter, for convenience of description, it is assumed that a processor 530 of the computing apparatus 500 of FIG. 31 executes a program stored in a memory (520 of FIG. 31) to train the first and second neural network models 1210 and 1220 described with reference to FIGS. 18 and 19. That is, it may be considered that operations performed by a label image generation module 1810 or an optimizer 1820 and calculation of a loss function as described below with reference to FIGS. 18 and 19 and calculation of a loss function are actually performed by the processor 530 of the computing apparatus 500.

Figure 31:
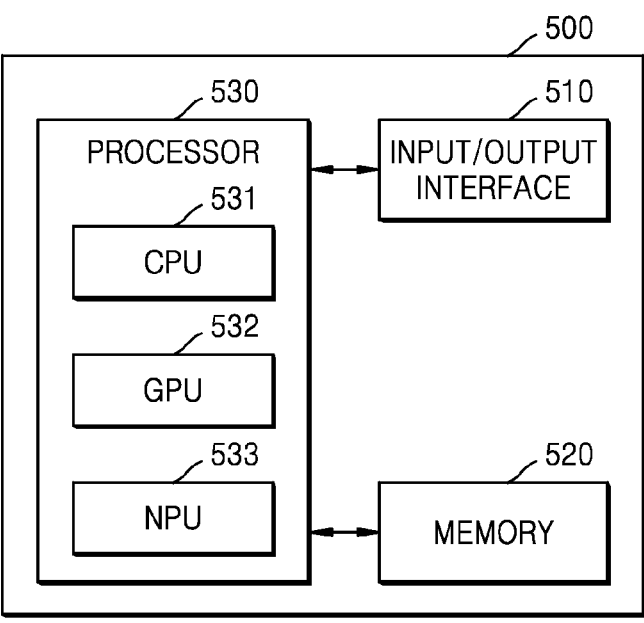
FIG. 31 is a block diagram of a configuration of a computing apparatus for training neural network models, according to an embodiment of the disclosure.

The processor 530 of the computing apparatus 500 of FIG. 31 may include a CPU 531, a GPU 532, and an NPU 533, and may execute a program stored in the memory 520 by using at least one of the CPU 531, the GPU 532, or the NPU 533 to train the first and second neural network models 1210 and 1220. The input/output (I/O) interface 510 of the computing apparatus 500 may receive a command related to training of the first and second neural network models 1210 and 1220 and display information related thereto.

FIG. 18 is a diagram for describing a process of training the first neural network model 1210, according to an embodiment of the disclosure. Referring to FIG. 18, the label image generation module 1810 may output a label image 163 obtained by correcting the input image 161 by using at least one image correction algorithm. When the label image generation module 1810 corrects the input image 161, the correction parameter 1610 is applied to an image correction algorithm, and the correction parameter 1610 and the image correction algorithm used by the label image generation module 1810 are described in detail with reference to FIGS. 20 to 23.

Figure 20:
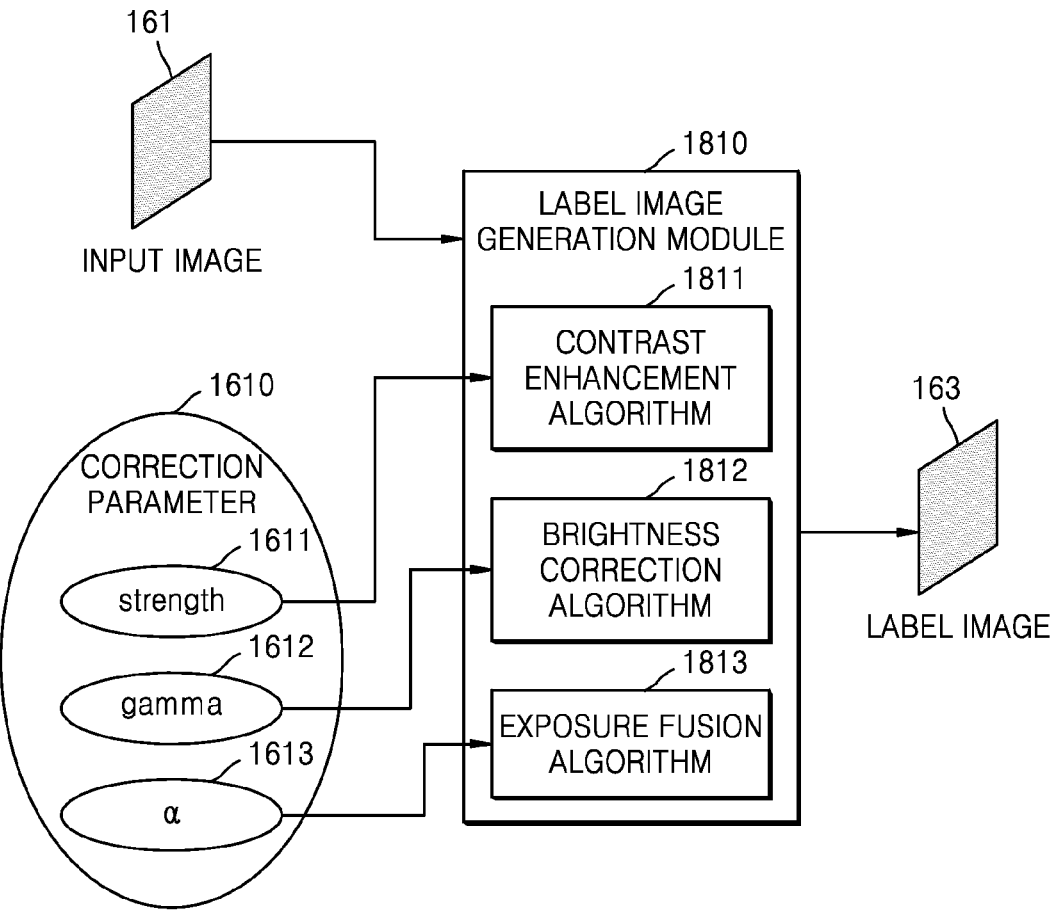
FIG. 20 is a diagram for describing a process, performed by a label image generation module, of generating a label image from an input image, according to an embodiment of the disclosure.

FIG. 20 is a diagram for describing a process, performed by the label image generation module 1810, of generating the label image 163 based on the input image 161, according to an embodiment of the disclosure. Referring to FIG. 20, the label image generation module 1810 may use a contrast enhancement algorithm 1811, a brightness correction algorithm 1812, and an exposure fusion algorithm 1813. However, the image correction algorithms used by the label image generation module 1810 as described with reference to FIG. 20 are merely an example, and the label image generation module 1810 may use various other image correction algorithms.

FIG. 20 shows which parameters are specifically included in the correction parameter 1610 and which image correction algorithm corresponds to each parameter. Referring to FIG. 20, a strength value 1611 may be applied to the contrast enhancement algorithm 1811, a gamma value 1612 may be applied to the brightness correction algorithm 1812, and an $\alpha$ value 1613 may be applied to the exposure fusion algorithm 1813. Parameters, i.e., the strength value 1611, the gamma value 1612, and the $\alpha$ value 1613, respectively applied to the image correction algorithms are described with reference to FIGS. 21 to 23.

Figure 21:
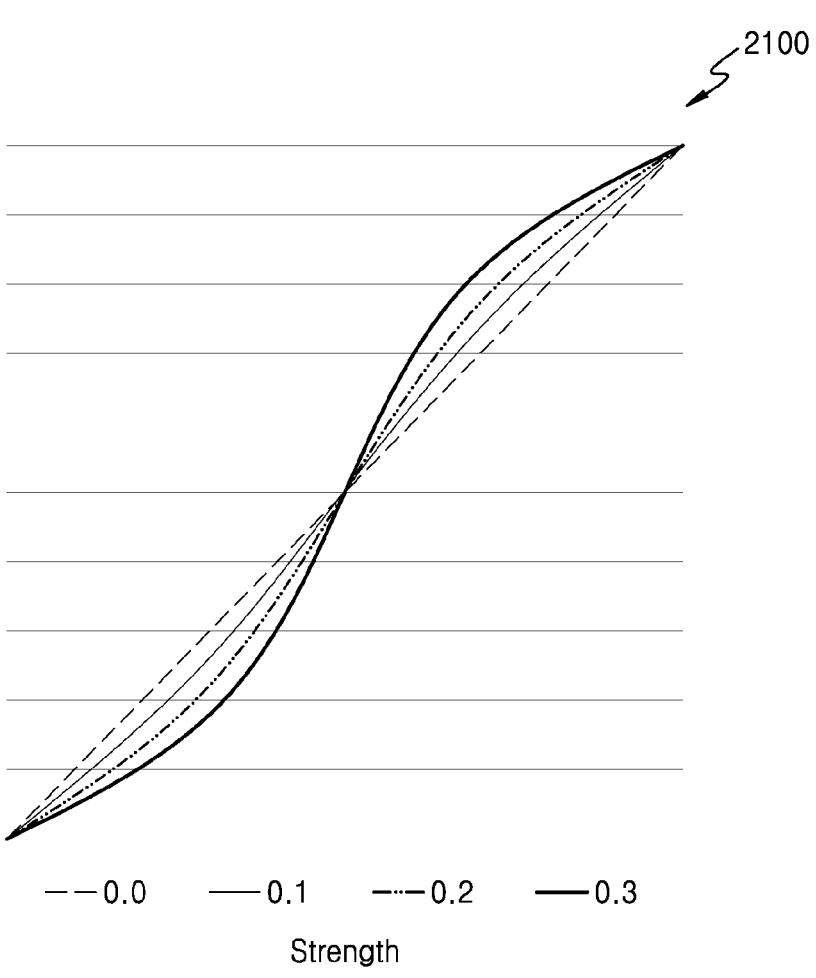
FIG. 21 is a diagram for describing a strength value applied to a contrast enhancement algorithm, according to an embodiment of the disclosure.

FIG. 21 is a diagram for describing the strength value 1611 applied to the contrast enhancement algorithm 1811, according to an embodiment of the disclosure. According to an embodiment of the disclosure, the contrast enhancement algorithm 1811 is a technique for adjusting contrast by using a curve.

As seen in a graph 2100 of FIG. 21, curvature of an S-curve changes according to the strength value 1611, and in particular, the curvature of the S-curve increases as the strength value 1611 increases. As a slope of the S-curve increases, tones are stretched, and thus, contrast is increased. Therefore, as the strength value 1611 increases, the contrast enhancement algorithm 1811 may increase the contrast of the input image 161.

Figure 22:
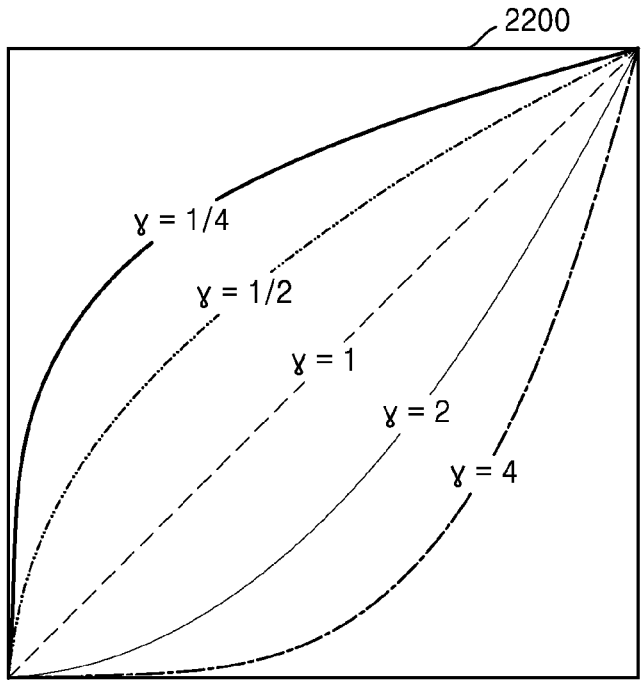
FIG. 22 is a diagram for describing a gamma value applied to a brightness correction algorithm, according to an embodiment of the disclosure.

FIG. 22 is a diagram for describing the gamma value 1612 applied to the brightness correction algorithm 1812, according to an embodiment of the disclosure. A graph 2200 of FIG. 22 shows gamma curves associated with different gamma values 1612. An x-axis of the graph 2200 represents a contrast value, and a y-axis represents brightness. As seen in the graph 2200 of FIG. 22, brightness increases as the gamma value 1612 decreases. Therefore, as the gamma value 1612 decreases, the brightness correction algorithm 1812 may increase the brightness of the input image 161.

Figure 23:
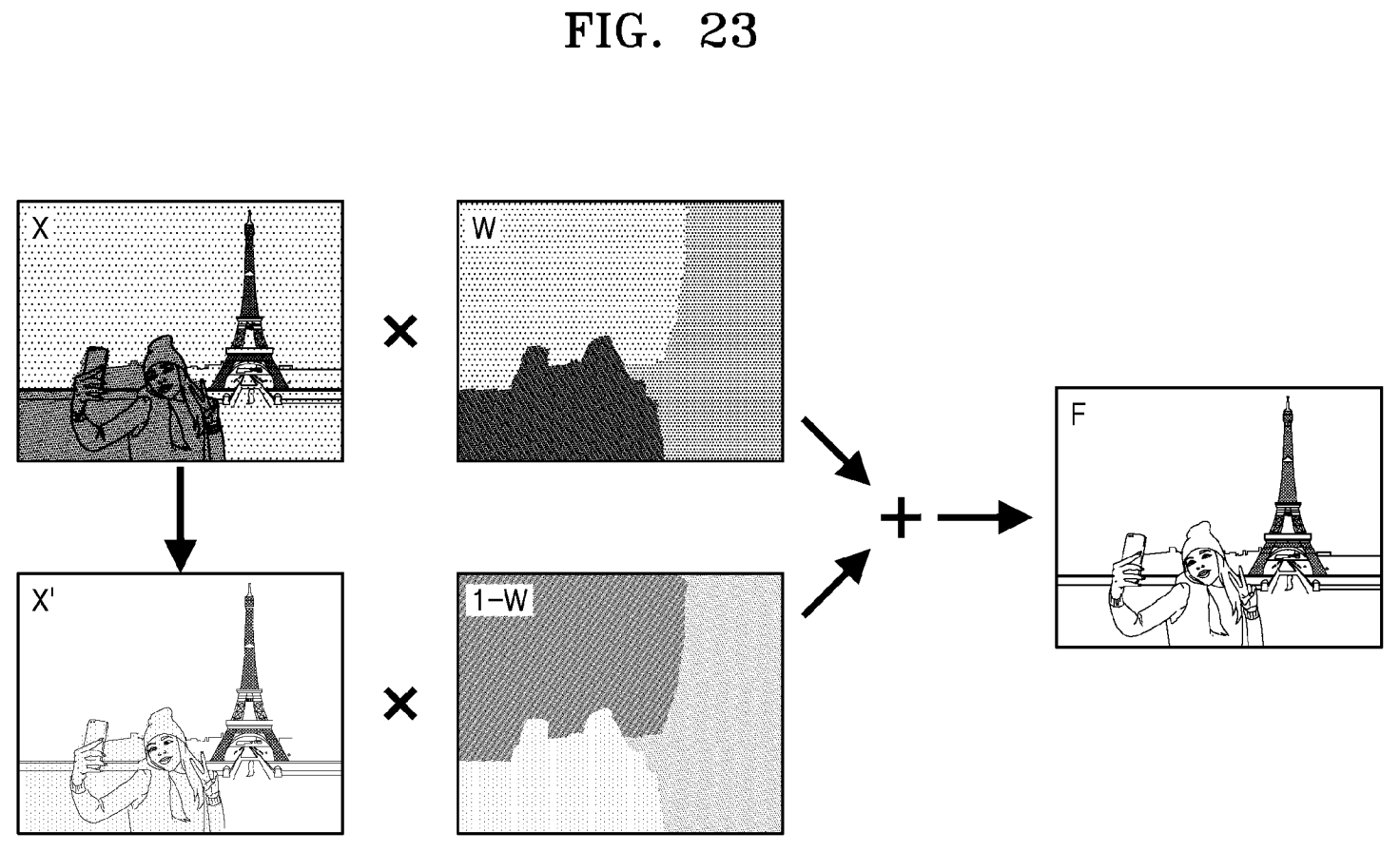

FIG. 23 is a diagram for describing the $\alpha$ value 1613 applied to the exposure fusion algorithm 1813, according to an embodiment of the disclosure. The exposure fusion algorithm 1813 may generate a processed image X' with a different exposure from a base image X and output a fused image F by respectively multiplying the base image X and the processed image X' by weights W and (1-W) and then summing together the products. According to an embodiment of the disclosure, the basic image X may correspond to the input image 161 of FIG. 20 and the output fused image F may correspond to the label image 163 of FIG. 20.

The exposure fusion algorithm 1813 may generate a processed image X' from the basic image X according to Equation 1 below.

$$X'=\alpha X^{\beta} \qquad \text{Equation 1}$$

When the exposure fusion algorithm 1813 is performed according to the method described above, the fusion image F may become brighter than the basic image X as the a value 1613 increases, and also, the fusion image F may become brighter than the basic image X as a β value decreases. Although FIG. 23 shows that the α value 1613 is used as a correction parameter for the exposure fusion algorithm 1813, the α value may be used as the correction parameter instead of the β value 1613, or both the α value 1613 and the β value may be used as the correction parameter.

The label image generation module 1810 may output the label image 163 in which at least one of characteristics of the input image 161 has been adjusted by respectively applying the strength value 1611, the gamma value 1612, and the α value 1613 in the correction parameter 1610 to the image correction algorithms described above, i.e., the contrast enhancement algorithm 1811, the brightness correction algorithm 1812, and the exposure fusion algorithm 1813. The label image generation module 1810 may use a combination of at least one of the image correction algorithms shown in FIG. 20, i.e., at least one of the contrast enhancement algorithm 1811, the brightness correction algorithm 1812, or the exposure fusion algorithm 1813, or use other types of image correction algorithms.

According to an embodiment of the disclosure, the order of the strength value 1611, the gamma value 1612, and the α value 1613 that are parameter values included in the correction parameter 1610 may be maintained the same during training and inference. In other words, according to an embodiment of the disclosure, the order of the strength value 1611, the gamma value 1612, and the α value 1613, that are types of parameters in the correction parameter 1610 used during training, may be maintained the same during actual use.

For example, when the calibration parameter 1610 is in the form of a column vector, an element in each row may correspond to the same type of parameter (a parameter applied to the same image correction algorithm) during training and inference.

A specific example is described.

As in the embodiment of the disclosure shown in FIG. 20, when an element in a first row of the correction parameter (the column vector) 1610 used during training is the strength value 1611 that is the parameter applied to the contrast enhancement algorithm 1811, an element in a second row is the gamma value 1612 that is the parameter applied to the brightness correction algorithm 1812, and an element in a third row is the α value 1613 that is the parameter applied to the exposure fusion algorithm 1813, the same may also be applied to a correction parameter used during inference, i.e., an element in a first row may be the strength value 1611 applied to the contrast enhancement algorithm 1811, an element in a second row may be the gamma value 1612 applied to the brightness correction algorithm 1812, and an element in a third row may be the α value 1613 applied to the exposure fusion algorithm 1813.

Figure 24:
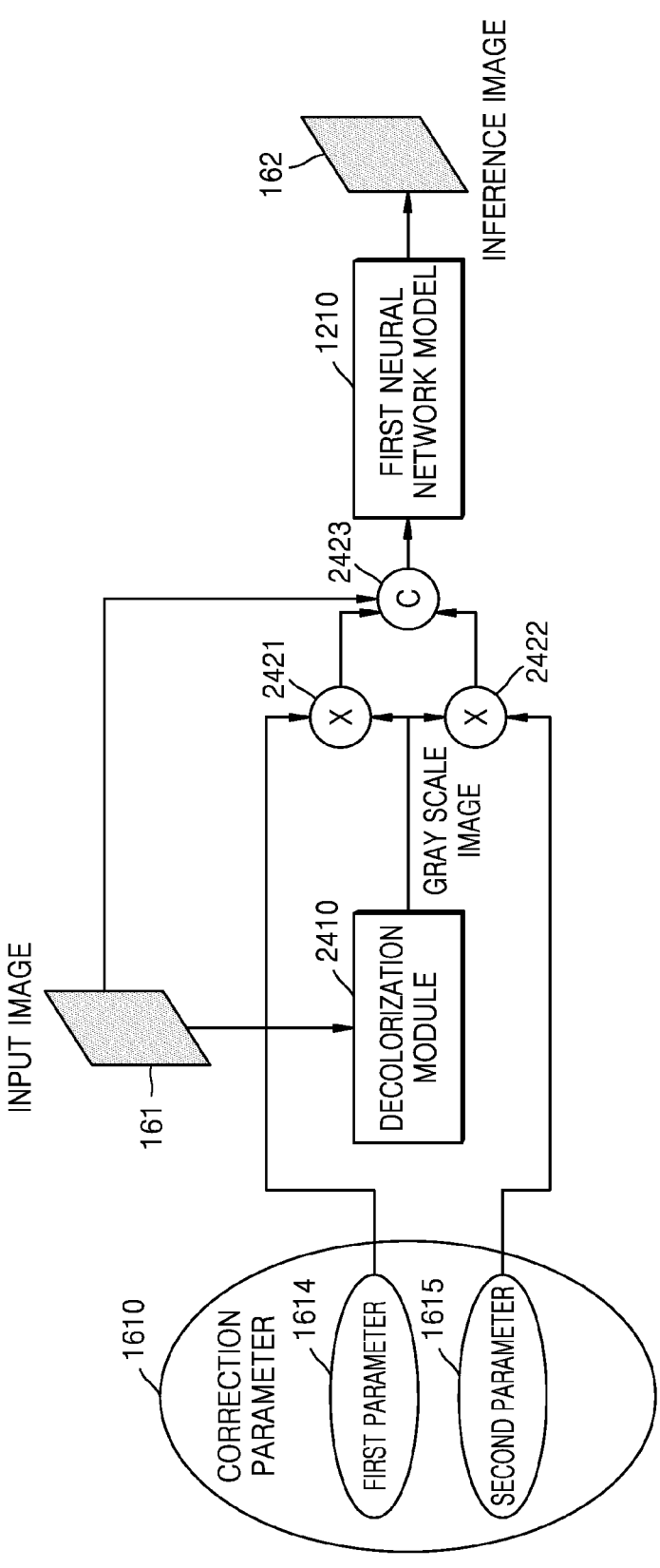
FIG. 24 is a diagram for describing a method of applying a correction parameter as an input to a first neural network model, according to an embodiment of the disclosure.

Referring to FIG. 24, two parameter values 1614 and 1615 are input to the first neural network model 1210 after undergoing scaled concatenation (See 2501 of FIG. 25) with the input image 161 and a grayscale image obtained by converting the input image 161. That is, grayscale images respectively multiplied (or divided by or added to) by the parameter values 1614 and 1615 are concatenated channel-wise to the input image 161 and input to the first neural network model 1210, and at this time, because the order of channels during training has to be the same as during inference, the order of the parameter values 1614 and 1615 included in the correction parameter 1610 during training needs to be maintained the same during inference.

Furthermore, according to an embodiment of the disclosure, the number of bits of each of the strength value 1611, the gamma value 1612, and the α value 1613 that are the parameter values included in the correction parameter 1610 in the embodiment of the disclosure shown in FIG. 20 may be maintained the same both during training and inference. An embodiment of the disclosure in which the order of the strength value 1611, the gamma value 1612, and the α value 1613 that are parameter values included in the correction parameter 1610, and the number of bits of each of the parameter values is maintained the same both during training and inference is described in detail.

It is assumed that the correction parameter 1610 used in training each of the first and second neural network models 1210 and 1220 is binary data "01010110". It is further assumed that the first 3 bits of data ("010") is the strength value 1611 that is a parameter to be applied to the contrast enhancement algorithm 1811, the following 2 bits of data ("10") is the gamma value 1612 that is a parameter to be applied to the brightness correction algorithm 1812, and the last 3 bits of data ("110") is the α value 1613 that is a parameter to be applied to the exposure fusion algorithm 1813.

The number of bits of each of the parameters, i.e., the strength value 1611, the gamma value 1612, and the α value 1613, and the order that they are arranged have to be maintained the same even during actual use (inference) of the first and second neural network models 1210 and 1220. For example, when binary data of "10111100" is input as the correction parameter 1610 to the first neural network model 1210 during inference, the first 3 bits of data ("101") is the strength value 1611 that is a parameter to be applied to the contrast enhancement algorithm 1811, the following 2 bits of data ("11") is the gamma value 1612 that is a parameter to be applied to the brightness correction algorithm 1812, and the last 3 bits of data ("100"") is the α value 1613 that is a parameter to be applied to the exposure fusion algorithm 1813.

Referring back to FIG. 18, the label image 163 output from the label image generation module 1810 may be used as training data (in particular, ground truth data) for training the first neural network model 1210. The first neural network model 1210 may be trained to maximize the similarity between the label image 163 and the inference image 162 that is output from the first neural network model 1210 when the input image 161 and the correction parameter 1610 are fed into the first neural network model 1210. That is, according to an embodiment of the disclosure, the first neural network model 1210 may be a model trained to minimize a difference between the inference image 162, which is output when the input image 161 and the correction parameter 1610 are received as an input, and the label image 163 corresponding to the correction parameter 1610. In this case, the label image 163 corresponding to the correction parameter 1610 may be an image obtained by correcting the input image 161 by using at least one image correction algorithm to which the correction parameter 1610 is applied.

In other words, the optimizer 1820 may update the first neural network model 1210 to minimize a loss value of a loss function 1620 representing a difference between the inference image 162 and the label image 163. In this case, the loss function 1620 may consist of a combination of mean absolute error (MAE), mean square error (MSE), and structural similarity index measure (SSIM).

As described above, when training the first neural network model 1210, the input image 161, the label image 163, and the correction parameter 1610 may be used as training data. According to an embodiment of the disclosure, a plurality of label images 163 may be generated while changing the correction parameter 1610 for various input images 161, and the first neural network model 1210 may be trained by using a combination of the input images 161, the label images 163, and the correction parameter 1610 collected in this way as training data.

In this way, the correction parameter 1610 is used as an input to the first neural network model 1210 when training the first neural network model 1210, so that the first neural network model 1210 may learn a relationship between the correction parameter 1610 and the label image 163. In other words, it may be considered that the first neural network model 1210 learns how the corrected label image 163 is generated when a certain correction parameter 1610 is applied to the input image 161. When only the correction parameter 1610 is changed while the input image 161 fed into the trained first neural network model 1210 remains the same, the inference image 162 output from the first neural network model 1210 is also changed. Therefore, the user may control the inference image 162 output from the first neural network model 1210 to have desired image characteristics by adjusting the correction parameter 1610 input to the first neural network model 1210. A specific embodiment of the disclosure in which the correction parameter 1610 is applied as an input to the first neural network model 1210 is described below with reference to FIG. 24.

FIG. 24 is a diagram for describing a method of applying a correction parameter as an input to a first neural network model, according to an embodiment of the disclosure. In the embodiment of the disclosure shown in FIG. 24, it is assumed that the correction parameter 1610 includes a first parameter 1614 and a second parameter 1615.

Referring to FIG. 24, the input image 161 is converted into a grayscale image by a decolorization module 2410. A first operator 2421 performs a multiplication between the grayscale image and the first parameter 1614, and a second operator 2422 performs a multiplication between the grayscale image and the second parameter 1615. A third operator 2423 may perform concatenation on the input image 161, an output of the first operator 2421 and an output of the second operator 2422, and may output a concatenation result to the first neural network model 1210. That is, according to an embodiment of the disclosure, the parameters 1614 and 1615 included in the correction parameter 1610 may be applied to the grayscale image obtained by converting the input image 161, and then input to the first neural network model 1210 together with the input image 161.

Moreover, although FIG. 24 shows the grayscale image is multiplied by each of the first parameter 1614 and the second parameter 1615 and is then concatenated to the input image 161, according to an embodiment of the disclosure, the grayscale image and the parameters 1614 and 1615 may be processed by using operations other than the multiplication.

For example, the grayscale image may be concatenated to the input image 161 after being divided by each of the first and second parameters 1614 and 1615 or after adding each of the first and second parameters 1614 and 1615 to the grayscale image.

Figure 19:
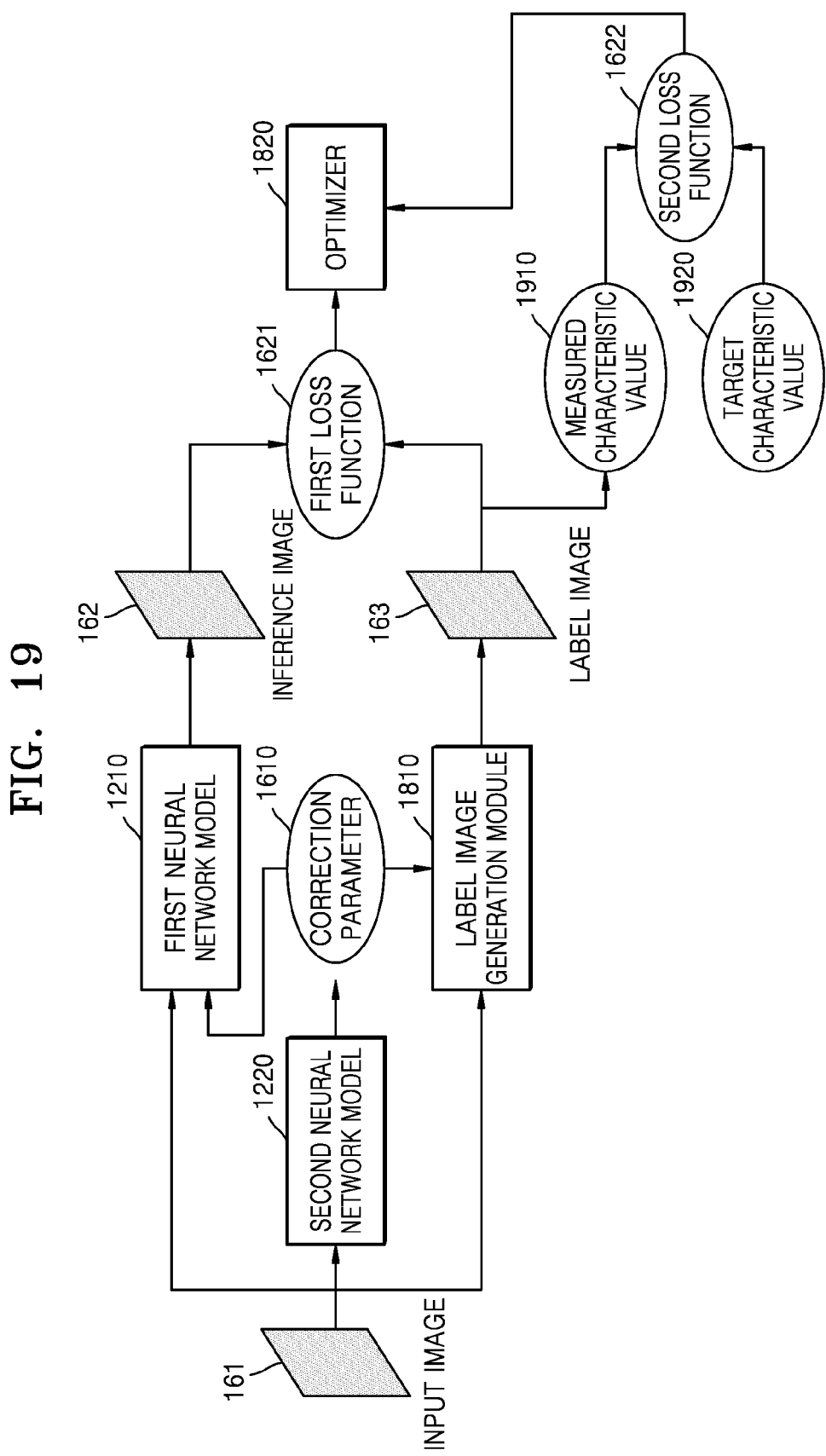
FIG. 19 is a diagram for describing a process of training a second neural network model, according to an embodiment of the disclosure.

FIG. 19 is a diagram for describing a process of training the second neural network model 1220, according to an embodiment of the disclosure.

First, the reason for using the second neural network model 1220 is described.

The second neural network model 1220 may infer the correction parameter 1610 for correcting the input image 161 to have image characteristics that many users would typically find pleasing (e.g., image characteristics determined to be optimal by a designer of a neural network model). Therefore, the second neural network model 1220 may be used to automatically generate (infer) a correction parameter for correcting the input image 161 to have optimal image characteristics without the user needling to set or adjust a correction parameter each time, and the input image 161 may be corrected according to the correction parameter and presented to the user. For example, when the user captures an image via a terminal where the first and second neural network models 1210 and 1220 are embedded, the captured image may be corrected according to the correction parameter 1610 inferred by the second neural network model 1220 and displayed on a screen of the terminal as a preview.

According to an embodiment of the disclosure, as described above, a neural network model included in the image correction module 1200 may be pre-trained in a direction to appropriately correct image characteristics according to the shooting context. Thus, the user or manager may preset a desired direction of correction and train the second neural network model 1220 to infer the correction parameter 1610 for correcting image characteristics in the preset direction. By doing so, the user or administrator may ensure that the image is appropriately corrected according to the shooting context by simply setting the direction of correction of the image characteristics without having to manually adjust the correction parameter 1610.

Therefore, the user of the terminal may initially check an image having good image characteristics (brightness, contrast, etc.) via a preview, and adjust the correction parameter 1610 to change the image characteristics only when the preview is not satisfactory.

Referring to FIG. 19, the second neural network model 1220 that receives the input image 161 and infers and outputs a correction parameter 1610 is added. As shown in FIG. 19, training of the two neural network models, i.e., the first neural network model 1210 and the second neural network model 1220, may be performed simultaneously while both the first neural network model 1210 and the second neural network model 1220 are connected, or the first neural network model 1210 may be trained first, and the second neural network model 1220 may be trained while the trained first neural network model 1210 is fixed (parameters included in the first neural network model 1210 are fixed). In addition, the first neural network model 1210 and the second neural network model 1220 may be trained separately.

When training the second neural network model 1220, a measured characteristic value 1910 obtained by quantitatively digitizing characteristics (e.g., brightness, contrast, color temperature, etc.) of the label image 163 is compared with a preset target characteristic value 1920, and the second neural network model 1220 may be updated to minimize a difference between the measured characteristic value 1910 and the preset target characteristic value 1920. The target characteristic value 1920 may be preset to a value desired by a user (administrator). That is, according to an embodiment of the disclosure, the second neural network model 1220 may be a model trained to minimize the difference between the correction parameter 1610 inferred by the second neural network model 1220 when the input image 161 is fed thereto, and a correction parameter that causes the label image 163 to have preset image characteristics (a correction parameter that causes the label image generation module 1810 to output an image corresponding to the target characteristic value 1920 in FIG. 19.

In other words, the optimizer 1820 may update the second neural network model 1220 to minimize a loss value of a second loss function 1622 representing a difference between the measured characteristic value 1910 and the target characteristic value 1920. In this case, the second loss function 1622 may consist of a combination of MAE, MSE, and SSIM.

According to an embodiment of the disclosure, the measured characteristic value 1910 and the target characteristic value 1920 used when training the second neural network model 1220 may each include a plurality of values respectively corresponding to a plurality of image characteristics. For example, the measured characteristic value 1910 and the target characteristic value 1920 may each include a first characteristic value obtained by quantifying brightness of an image and a second characteristic value obtained by quantifying a color temperature of the image.

In the embodiment of the disclosure shown in FIG. 19, the measured characteristic value 1910 for the label image 163 is obtained for training of the second neural network model 1220, and the obtained measured characteristic value 1910 is compared to the preset target characteristic value 1920. However, according to an embodiment of the disclosure, the measured characteristic value 1910 may also be obtained for an image generated in the middle of a process of converting the input image 161 to the label image 163 (hereinafter referred to as the "intermediate label image"), and the second neural network model 1220 may be trained by comparing the obtained measured characteristic value 1910 to the preset target characteristic value 1920.

A specific example is described with reference to FIG. 20.

According to an embodiment of the disclosure, for training of the second neural network model 1220, a characteristic value may be measured for an image (an intermediate label image) obtained by applying only some of the contrast enhancement algorithm 1811, the brightness correction algorithm 1812, and the exposure fusion algorithm 1813 that are the plurality of image correction algorithms in the label image generation module 1810, and the second neural network model 1220 may be trained by comparing the measured characteristic value to a preset target characteristic value.

In FIG. 20, it is assumed that when the input image 161 is fed into the label image generation module 1810, the input image 161 is converted into the label image 163 as it sequentially passes through the contrast enhancement algorithm 1811, the brightness correction algorithm 1812, and the exposure fusion algorithm 1813.

For example, a measured characteristic value may be obtained by quantifying "brightness" of an intermediate label image (an image input to the exposure fusion algorithm 1813) obtained by applying only the contrast enhancement algorithm 1811 and the brightness correction algorithm 1812 to the input image 161, and the second neural network model

1220 may be trained to minimize a difference (a loss) between the obtained measured characteristic value and a preset target characteristic value for the "brightness". When the second neural network model 1220 is trained in this way, the $\alpha$ value 1613 applied to the exposure fusion algorithm 1813 may be trained to minimize a separate loss regardless of a target brightness (brightness corresponding to the target characteristic value).

According to an embodiment of the disclosure, the second neural network model 1220 may include a plurality of neural network models. For example, when the second neural network model 1220 infers a first correction parameter and a second correction parameter, a neural network model for inferring each correction parameter may exist separately. Furthermore, the second neural network model 1220 may be changed to infer the first to third correction parameters by adding a neural network model for inferring the third correction parameter to the second neural network model 1220 as needed.

(3) (Usage Process) Method of Correcting Image by Using First Neural Network Model and Second Neural Network Model As described above, according to an embodiment of the disclosure, the ISP 3130 may be included in the camera module 3100 of the user terminal 3000 of FIG. 3, and the first neural network model 1210 and the second neural network model 1220 may be included in the image correction module 3132 of the ISP 3130.

Figure 25:
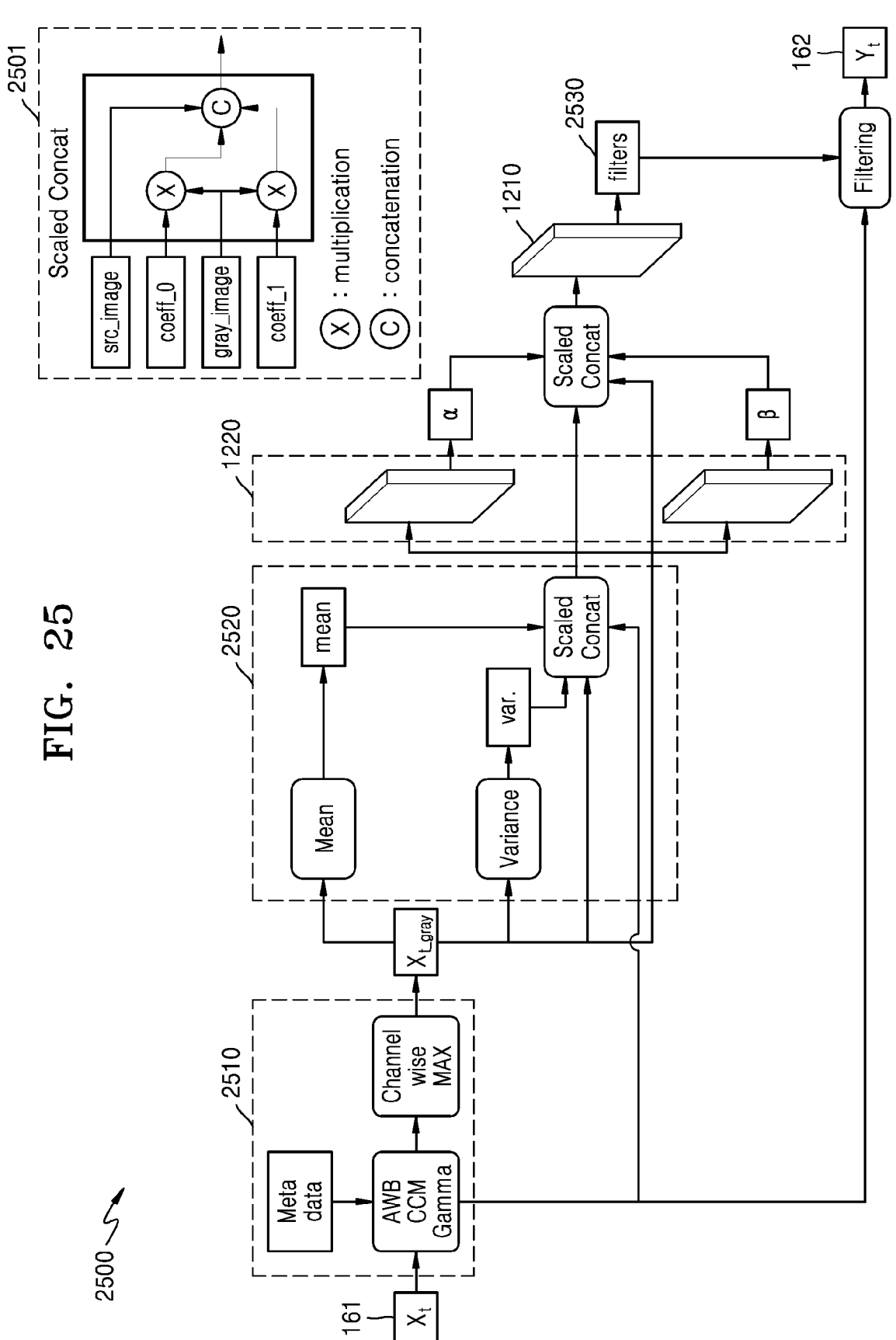
FIG. 25 is a diagram illustrating a specific embodiment of the disclosure in which neural network models according to an embodiment of the disclosure are included in an image correction module.

FIG. 25 is a diagram illustrating a specific embodiment of the disclosure in which first and second neural network models 1210 and 1220 according to an embodiment of the disclosure are included in the image correction module 3132 of FIG. 3.

Referring to FIG. 25, according to an embodiment of the disclosure, the image correction module 2500 may include a first preprocessor 2510, a second preprocessor 2520, the first neural network model 1210, and the second neural network model 1220.

The first preprocessor 2510 is a component for converting the input image 161 into a grayscale image, and may convert the input image 161 into a grayscale image and output the gray scale image by applying an auto white balance (AWB) gain, a CCM, and a gamma included in the metadata to the input image 161 and then performing a channel-wise MAX operation to extract a maximum value of RGB for each pixel.

The second preprocessor 2520 extracts a mean and a variance of pixel values from the grayscale image output from the first preprocessor 2510, and performs scaled concatenation on the extracted mean and variance as well as the input image 161 and the grayscale image and outputs a result of the scaled concatenation. A specific operation structure for performing scaled concatenation is shown in area 2501.

The second neural network model 1220 may receive the output of the second preprocessor 2520 to infer correction parameters $\alpha$ and $\beta$. The correction parameters $\alpha$ and $\beta$ inferred by the second neural network model 1220 may be scaled concatenated together with the input image 161 and the grayscale image and input to the first neural network model 1210.

The first neural network model 1210 may output filters 2530 corresponding to the input image 161 and the correction parameters $\alpha$ and $\beta$, and the filters 2530 output in this way may be used to convert the input image 161 into the inference image 162.

According to an embodiment of the disclosure, the correction parameters $\alpha$ and $\beta$ inferred by the second neural network model 1220 may be adjusted by a user. When the user adjusts the correction parameters α and β, the first neural network model 1210 may output the filters 2530 corresponding to the adjusted correction parameters α and β, and the filters 2530 output in this way may be used to convert the input image 161 into the inference image 162.

According to an embodiment of the disclosure, as described above, the user may check an image corrected according to the correction parameters α and β inferred by the second neural network model 1220 via a preview, and adjust the correction parameters α and β to have desired image characteristics.

Hereinafter, a method of correcting an image by using a neural network model is described with reference to FIGS. 26 to 28. Hereinafter, for convenience of description, it is assumed that the ISP 3130 (corresponding to the ISP 1000 of FIG. 1) of the user terminal 3000 of FIG. 3 performs operations illustrated in FIGS. 26 to 28. However, the disclosure is not limited thereto, and all or some of the operations of FIGS. 26 to 28 may be performed by the main processor 3200 of the user terminal 3000 or a processor of the cloud server 400 of FIG. 4.

Figure 26:
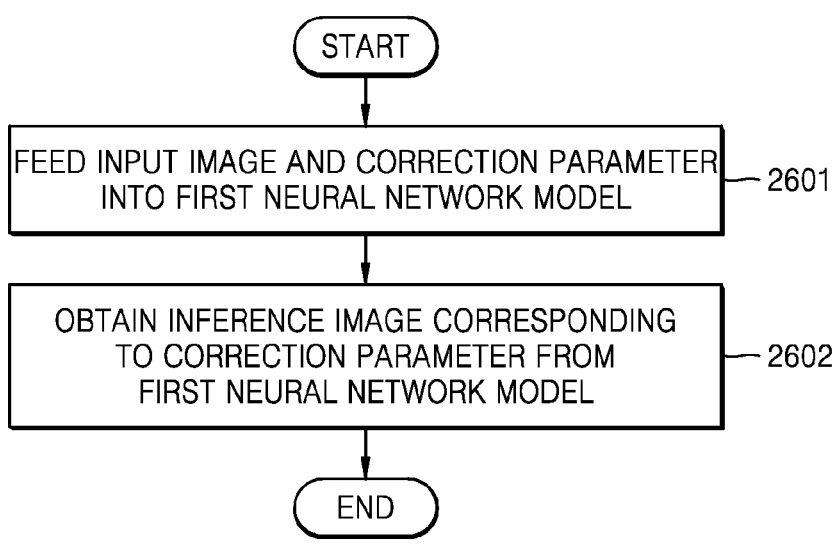
FIGS. 26 to 28 are flowcharts for describing a method of correcting an image by using a neural network model, according to an embodiment of the disclosure.

Referring to FIG. 26, in operation 2601, the ISP 3130 may feed an input image and a correction parameter into the first neural network model 1210. The first neural network model 1210 may be a model trained to minimize a difference between an inference image, which is output when the input image and the correction parameter are input, and a label image corresponding to the correction parameter. In this case, the label image corresponding to the correction parameter may be an image obtained by correcting the input image by using at least one image correction algorithm to which the correction parameter is applied.

The input image may be an image output by the image reconstruction module 1100 reconstructing raw images output from the image sensor 100. The correction parameter may be a preset value (e.g., a value used when training the first neural network model 1210) or a value adjusted according to a user's input. An embodiment of the disclosure in which the correction parameter is adjusted according to a user's input is described in detail below with reference to FIGS. 28 to 30.

In operation 2602, the ISP 3130 may obtain an inference image corresponding to the correction parameter from the first neural network model 1210. The ISP 3130 may display the obtained inference image on a screen of the user terminal 3000 or store the inference image in the memory 3240.

Figure 27:
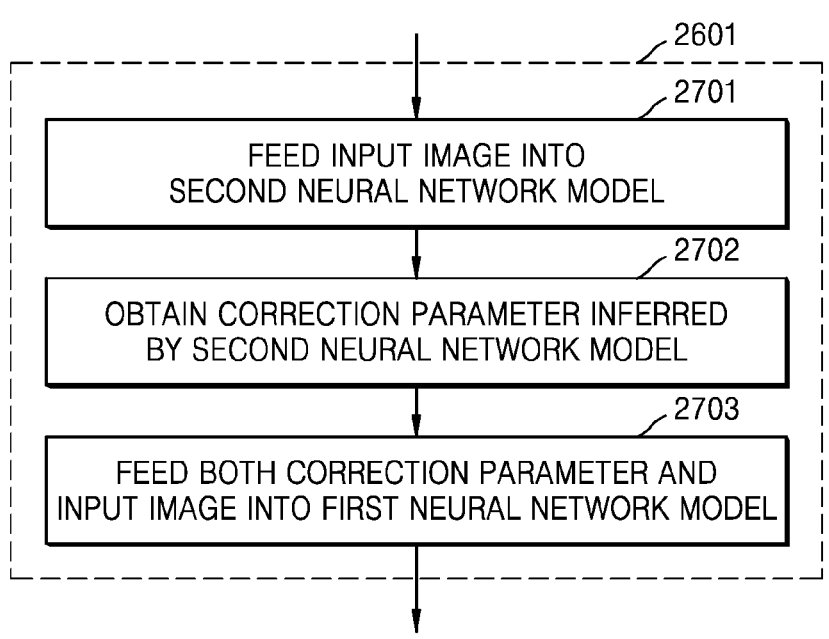

FIG. 27 is flowchart for describing an embodiment of the disclosure in which a second neural network model infers a correction parameter. The flowchart of FIG. 27 includes detailed operations included in operation 2601 of FIG. 26.

Referring to FIG. 27, in operation 2701, the ISP 3130 may feed an input image into the second neural network model 1220. The second neural network model 1220 may be a model trained to minimize a difference between a correction parameter inferred by the second neural network model 1220 when the input image is fed thereinto, and a correction parameter that causes the label image 163 to have preset image characteristics.

In operation 2702, the ISP 3130 may obtain a correction parameter inferred by the second neural network model 1220, and in operation 2703, the ISP 3130 may feed both the correction parameter and the input image into the first neural network model 1210.

Figure 28:
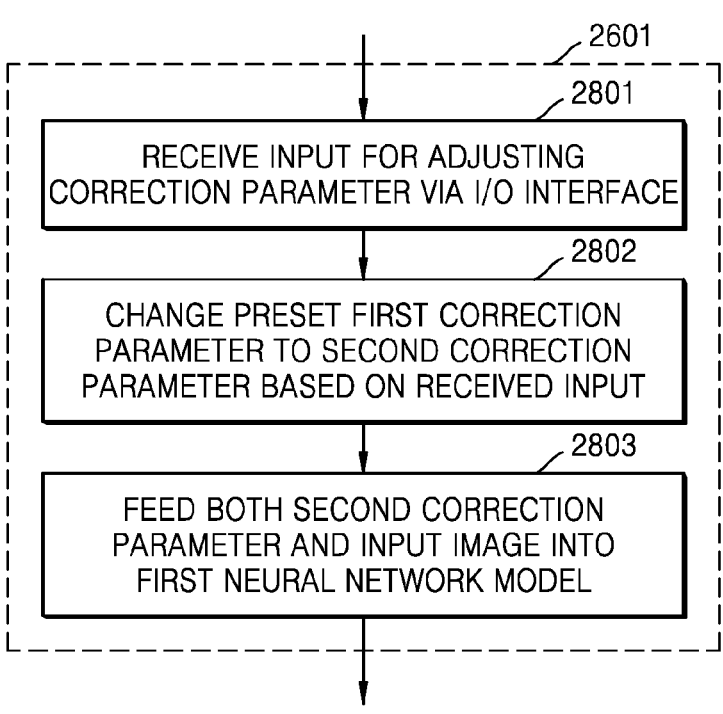

FIG. 28 is a flowchart for describing an embodiment of the disclosure in which a user adjusts a correction parameter.

The flowchart of FIG. 28 includes detailed operations included in operation 2601 of FIG. 26.

Referring to FIG. 28, in operation 2801, the ISP 3130 may receive an input for adjusting a correction parameter via an I/O interface (e.g., a touch screen, a microphone, etc.) of the user terminal 3000. In operation 2802, the ISP 3130 may change a preset first correction parameter to a second correction parameter based on the input received in operation 2801. In operation 2803, the ISP 3130 may feed both the second correction parameter and the input image as an input to the first neural network model 1210.

Figure 30:
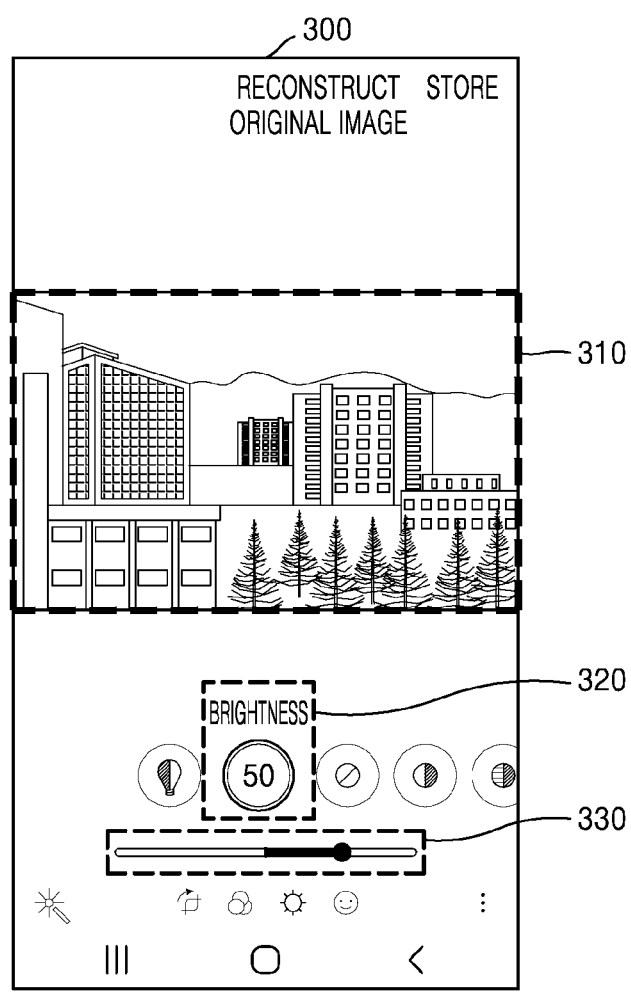
FIG. 30 is a diagram for describing a situation in which a user changes a correction parameter for brightness adjustment via a user interface (UI) displayed on a screen of a mobile terminal, according to an embodiment of the disclosure.

An embodiment of the disclosure in which the user changes a correction parameter for brightness adjustment via a UI displayed on the screen of the user terminal 3000 is illustrated in FIG. 30.

Referring to FIG. 30, an image to be corrected (an inference image corresponding to a preset first correction parameter) may be displayed in a first region 310 of a UI screen 300 for adjusting characteristics of an image, and a tool for adjusting the characteristics of the image may be displayed at a lower portion of the UI screen 300.

In the UI screen 300 shown in FIG. 30, it is assumed that the user has selected a tool for adjusting brightness of the image. Information indicating that a characteristic of the image currently being adjusted is "brightness" as well as a numerical value representing a degree of the current brightness may be displayed in a second region 320 of the UI screen 300. A slider for adjusting the brightness may be displayed in a third region 330 of the UI screen 300, and the user may adjust the brightness of an input image by moving the slider via a touch input.

When the user moves the slider in the third region 330 of the UI screen 300 of FIG. 30 to increase the brightness of the input image, the numerical value displayed in the second region 320 increases, and the ISP 3130 may adjust the first correction parameter to a second correction parameter to increase the brightness of the input image.

When the user captures images using the user terminal 3000 and selects a tool for adjusting the brightness of the image, initially, an image obtained by correcting an input image (e.g., a linear RGB image generated from raw images that are captured images) according to a correction parameter inferred by the second neural network model 1220 may be displayed in the first region 310 of the UI screen 300. When the user adjusts the brightness via the tool displayed in the second and third regions 320 and 330 of the UI screen 300, accordingly, the correction parameter may be adjusted (e.g., its value is increased by 2 times as shown in FIG. 29), and an image obtained by correcting the input image according to the adjusted correction parameter may be displayed in the first region 310.

As described above, because the first neural network model 1210 learns the relationship between a correction parameter and a label image, when the correction parameter is changed, a label image corresponding to the changed correction parameter may be inferred. FIG. 29 is a diagram for describing a change in an inference image when a correction parameter input to a first neural network model is changed, according to an embodiment of the disclosure.

Figure 29:
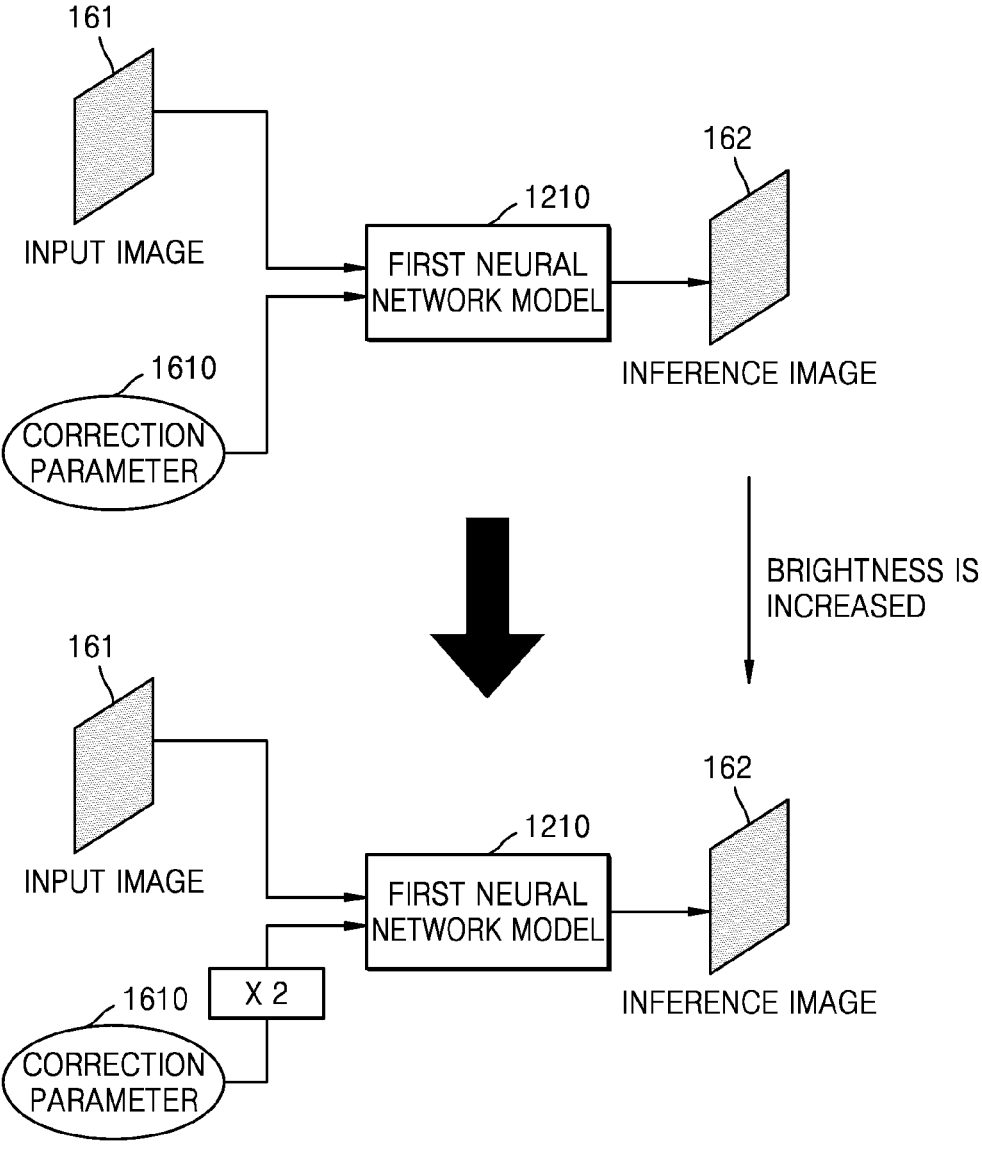
FIG. 29 is a diagram for describing a change in an inference image when a correction parameter input to a first neural network model is changed, according to an embodiment of the disclosure.

For convenience of description, it is assumed in FIG. 29 that the correction parameter 1610 includes only a parameter related to brightness adjustment. It is further assumed that the first neural network model 1210 is trained with a label image generated using an image correction algorithm for adjusting brightness and that the image correction algorithm used during training corrects an image to have the brightness that increases as a value of the correction parameter increases.

In the embodiment of the disclosure shown in FIG. 29, the value of the correction parameter 1610 is doubled. The brightness of the label image corresponding to the doubled value of the correction parameter 1610 is increased compared to that of a label image corresponding to the existing value of the correction parameter 1610. Therefore, the brightness of the inference image 162 output from the first neural network model 1210 also increases as the value of the correction parameter 1610 increases.

Moreover, although it has been described in the embodiment of the disclosure shown in FIG. 30 that the user performs an input for adjusting the correction parameter by touching the UI screen 300, the user may adjust the correction parameter via a voice input according to an embodiment of the disclosure. For example, the user may input a voice command instructing adjustment of characteristics of an image (e.g., "Hi Bixby, make the photo brighter") via a speaker provided in the user terminal 3000.

Hereinafter, a method of training the first neural network model 1210 and a method of training the second neural network model 1220 are respectively described with reference to FIGS. 32 and 33. Hereinafter, for convenience of description, it is described that the processor 530 of the computing apparatus 500 of FIG. 31 performs operations illustrated in FIGS. 32 and 33. However, the disclosure is not limited thereto, and all or some of the operations of FIGS. 32 and 33 may be performed by the main processor 3200 of the user terminal 3000 of FIG. 3.

Figure 32:
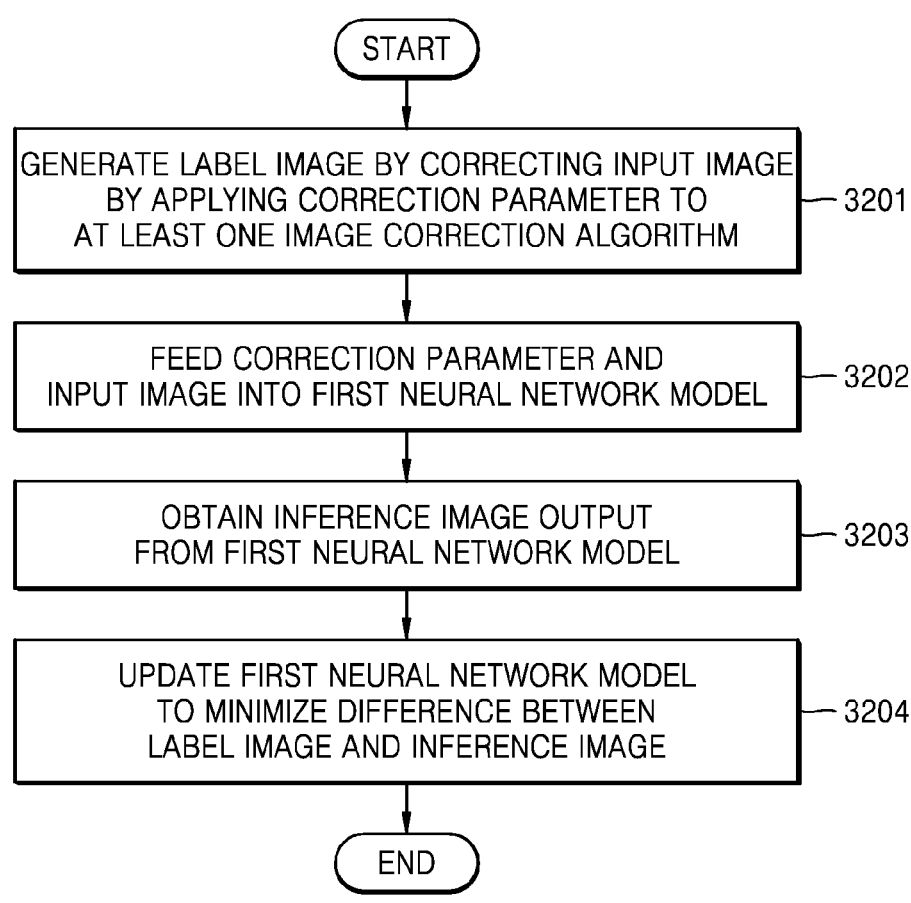
FIG. 32 is a flowchart for describing a method of training a first neural network model, according to an embodiment of the disclosure.

Referring to FIG. 32, in operation 3201, the processor 530 may generate a label image by correcting an input image by applying a correction parameter to at least one image correction algorithm.

In operation 3202, the processor 530 may feed both the correction parameter and the input image into a first neural network model, and in operation 3203, the processor 530 may obtain an inference image output from the first neural network model.

In operation 3204, the processor 530 may update the first neural network model to minimize a difference between the label image and the inference image.

Figure 33:
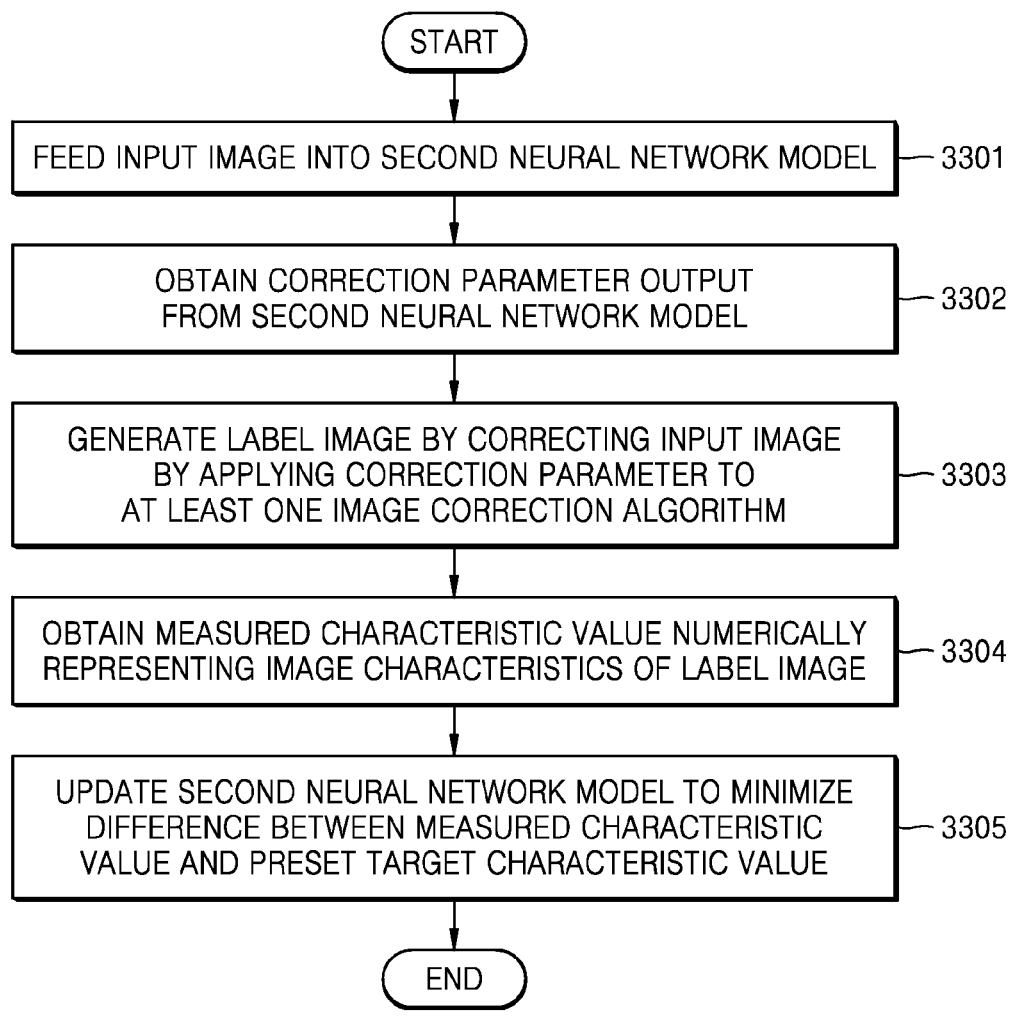
FIG. 33 is a flowchart for describing a method of training a second neural network model, according to an embodiment of the disclosure.

Referring to FIG. 33, the processor 530 may feed an input image into a second neural network model in operation 3301, and obtain a correction parameter output from the second neural network model in operation 3302.

In operation 3303, the processor 530 may generate a label image by correcting the input image by applying the correction parameter to at least one image correction algorithm.

In operation 3304, the processor 530 may obtain a measured characteristic value that numerically represents image characteristics of the label image, and in operation 3305, the processor 530 may update the second neural network model to minimize a difference between the measured characteristic value and a preset target characteristic value.

When the first and second neural network models 1210 and 1220 according to an embodiment of the disclosure are loaded into the user terminal 3000, etc., an update to the image correction module 3132 (corresponding to the image correction module 1200 of FIG. 1) may be easily performed. Hereinafter, a method of updating a neural network model according to an embodiment of the disclosure is described with reference to FIGS. 34 and 35.

Figure 34:
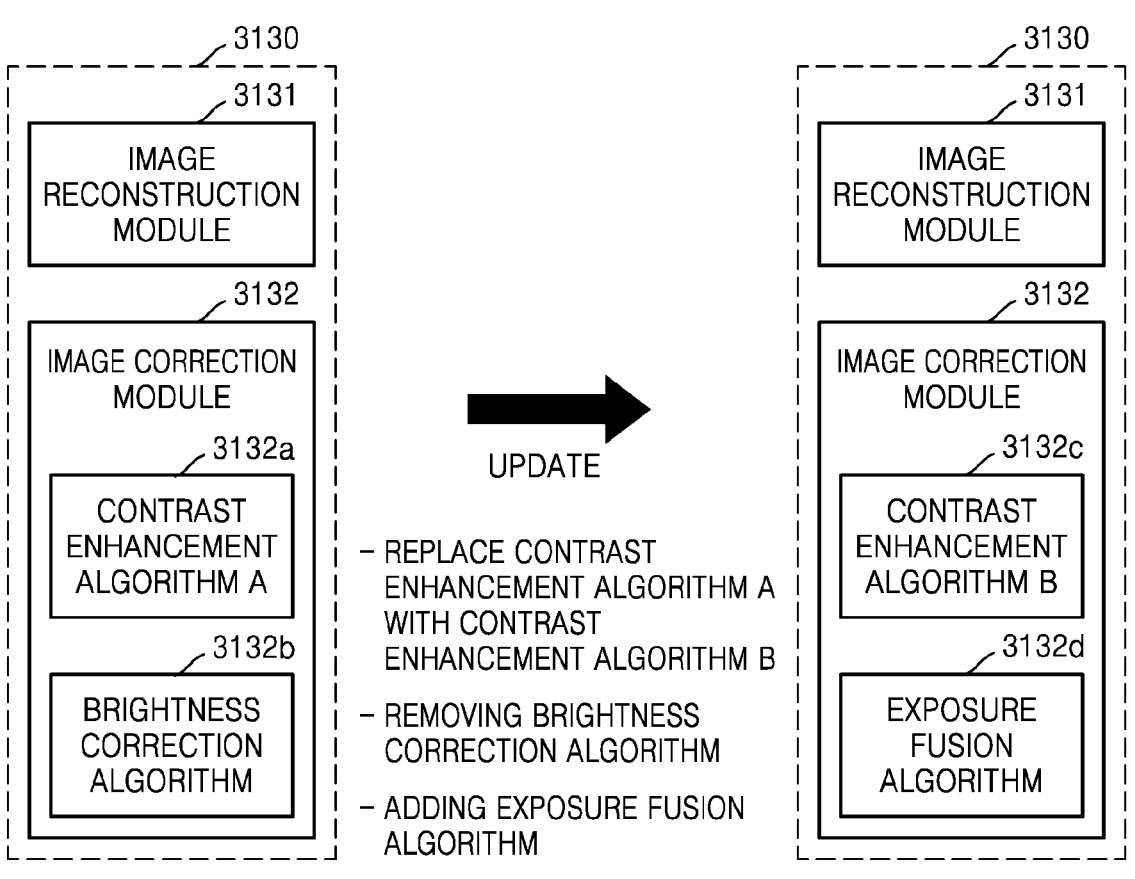
FIGS. 34 and 35 are diagrams for describing methods of updating a neural network model, according to an embodiment of the disclosure.

FIG. 34 shows an example in which the image correction module 3132 included in the ISP 3130 of the user terminal 3000 of FIG. 3 is implemented to include image correction algorithms instead of neural network models. Referring to FIG. 34, the image correction module 3132 is implemented to include a contrast enhancement algorithm A 3132a and a brightness correction algorithm 3132b.

In FIG. 34, it is assumed that an update to the image correction algorithms included in the image correction module 3132 is performed. The update are performed as follows:

1) Replacing contrast enhancement algorithm A with contrast enhancement algorithm B
2) Removing a brightness correction algorithm
3) Adding an exposure fusion algorithm The result of performing the update is shown on the right side of FIG. 34. Referring to FIG. 34, in the image correction module 3132, a contrast enhancement algorithm A 3132a is replaced with a contrast enhancement algorithm B 3132c, a brightness correction algorithm 3132b is removed, and an exposure fusion algorithm 3132d is added.

In this way, when the update to the image correction module 3132 is performed while the image correction module 3132 is implemented to include the image correction algorithms, the following problems may exist.

First, each time a change (replacement, removal, addition, etc.) is made to the image correction algorithm 3132, an optimization task is needed to improve a processing speed, which requires a lot of time and resources.

Second, because some image correction algorithms are implemented as separate hardware, hardware needs to be replaced or added to add the corresponding image correction algorithms, and such replacement or addition of hardware are subjected to many limitations especially when the image correction module 3132 is implemented on the user terminal 3000.

Figure 35:
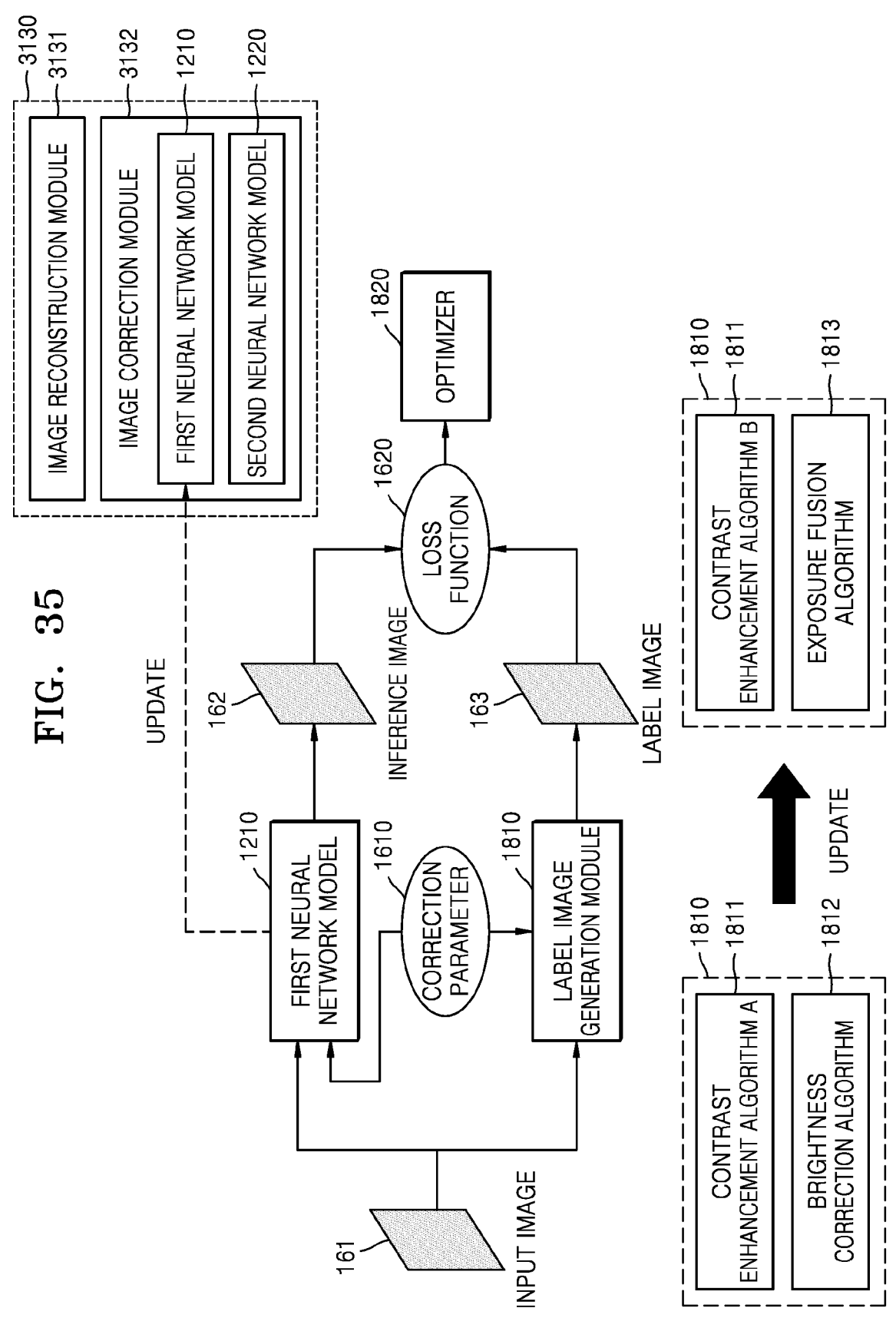

FIG. 35 shows an embodiment of the disclosure in which the image correction module 3132 included in the ISP 3130 of the user terminal 3000 of FIG. 3 is updated when implemented to include the first and second neural network models 1210 and 1220 according to an embodiment of the disclosure.

Referring to FIG. 35, in order to update the first neural network model 1210 included in the image correction module 3132, training of the first neural network model 1210 needs to be performed again. As described above, because training of the first neural network model 1210 may be performed by the separate computing apparatus 500 of FIG. 31, it is hereinafter assumed that the computing apparatus 500 performs training of the first neural network model 1210.

As described above, the label image generation module 1810 may include image correction algorithms corresponding to image correction characteristics to be learned by the first neural network model 1210. Referring to FIG. 35, the processor 530 initially configures the label image generation module 1810 to include the contrast enhancement algorithm A 3132a and the brightness correction algorithm 3132b, trains the first neural network model 1210, and then loads the trained first neural network 1210 into the image correction module 3132 of the user terminal 3000.

Thereafter, when it is necessary to adjust image correction characteristics of the image correction module 3132 of the user terminal 3000, the processor 530 may newly configure the label image generation module 1810 to include the contrast enhancement algorithm B 3132c and the exposure fusion algorithm 3132d, and train the first neural network model 1210 again. When training of the first neural network model 1210 is completed, the processor 530 may transmit the newly trained first neural network model 1210 to the user terminal 3000, and the user terminal 3000 may update the image correction module 3132 by installing the received first neural network model 1210.

In this way, when the image correction module 3132 is implemented to include the first and second neural network models 1210 and 1220 according to an embodiment of the disclosure, optimization is not required even when the image correction module 3132 is updated. In addition, because the computing apparatus 500 that trains the first and second neural network models 1210 and 1220 generally has sufficient hardware resources, image correction algorithms included in the label image generation module 1810 may be freely changed (replaced, deleted, added, or the like) for new training.

A method of processing an image by using a neural network model according to an embodiment of the disclosure may include obtaining an image captured via the image sensor 100, identifying a shooting context of the image, selecting a neural network model included in at least one of the image reconstruction module 1100 or the image correction module 1200 according to the shooting context, and processing the image by using the selected neural network model.

According to an embodiment of the disclosure, the shooting context may include at least one of a shooting condition or a shooting mode, the shooting condition may include at least one of an ISO value of the image, a time when the image is captured, or a location where the image is captured, and the shooting mode may include at least one of a normal shooting mode, a night shooting mode, or a zoom shooting mode.

According to an embodiment of the disclosure, a type of the image sensor 100 may be selected from among a plurality of different types of image sensor 100, based on at least one of the shooting condition or the shooting mode.

According to an embodiment of the disclosure, the selecting of the neural network model may include selecting a detailed component of the image reconstruction module 1100 based on at least one of the shooting context or the selected type of image sensor 100, and selecting one of a plurality of neural network models included in the image correction module 1200 based on at least one of the shooting context, the selected type of image sensor 100, or the selected detailed component of the image reconstruction module 1100.

According to an embodiment of the disclosure, the selecting of the detailed component of the image reconstruction module 1100 may include primarily selecting the detailed component based on at least one of the shooting mode or the selected type of image sensor 100, and maintaining or changing the primarily selected detailed component based on the shooting condition, and the detailed component of the image reconstruction module 1100 corresponding to the shooting mode or a type of the image sensor 100 may be designated in advance.

According to an embodiment of the disclosure, the selecting of the detailed component of the image reconstruction module 1100 may include selecting one of a plurality of neural network models included in the image reconstruction module 1100 based on an ISO value included in the shooting condition.

According to an embodiment of the disclosure, the selected neural network model may include a denoising function and may be a neural network model trained by using images containing noise corresponding to the ISO value.

According to an embodiment of the disclosure, the selecting of the one of the plurality of neural network models included in the image correction module 1200 may include selecting a neural network model corresponding to a combination of the selected type of image sensor 100 and the selected detailed component of the image reconstruction module 1100.

According to an embodiment of the disclosure, the selected neural network model may be a neural network model trained to correct image characteristics according to the shooting context.

According to an embodiment of the disclosure, a neural network model included in the image correction module 1200 may include the first neural network model 1210 and the second neural network model 1220, the first neural network model 1210 may be a model trained to minimize a difference between an inference image output when an input image and a correction parameter are fed into the first neural network model 1210 and a label image corresponding to the correction parameter, the label image corresponding to the correction parameter may be an image obtained by correcting the input image by using at least one image correction algorithm to which the correction parameter is applied, the correction parameter fed into the first neural network model 1210 may be a correction parameter inferred when the input image is fed into the second neural network model 1220, and the second neural network model 1220 may be a model trained to minimize a difference between the correction parameter inferred by the second neural network model 1220 when the input image is fed thereinto and a correction parameter that causes the label image to have preset image characteristics.

A computing apparatus for processing an image signal by using a neural network model, according to an embodiment of the disclosure, may include a memory storing a program for processing an image signal and at least one processor configured to execute the program to obtain an image captured via the image sensor 100, identify a shooting context of the image, select a neural network model included in at least one of the image reconstruction module 1100 or the image correction module 1200 according to the shooting context, and process the image by using the selected neural network model.

According to an embodiment of the disclosure, the shooting context may include at least one of a shooting condition or a shooting mode, the shooting condition may include at least one of an ISO value of the image, a time when the image is captured, or a location where the image is captured, and the shooting mode may include at least one of a normal shooting mode, a night shooting mode, or a zoom shooting mode.

According to an embodiment of the disclosure, a type of the image sensor 100 may be selected from among a plurality of different types of image sensors 100, based on at least one of the shooting condition or the shooting mode.

According to an embodiment of the disclosure, in selecting the neural network model, the at least one processor may be further configured to execute the program to select a detailed component of the image reconstruction module 1100 based on at least one of the shooting context or the selected type of image sensor 100 and then select one of a plurality of neural network models included in the image correction module 1200 based on at least one of the shooting context, the selected type of image sensor 100, or the selected detailed component of the image reconstruction module 1100.

According to an embodiment of the disclosure, in selecting the detailed component of the image reconstruction module 1100, the at least one processor may be further configured to execute the program to primarily select the detailed component based on at least one of the shooting mode or the selected type of image sensor 100, and then maintain or change the primarily selected detailed component based on the shooting condition, and the detailed component of the image reconstruction module 1100 corresponding to the shooting mode or a type of the image sensor 100 may be designated in advance.

According to an embodiment of the disclosure, in selecting the detailed component of the image reconstruction module 1100, the at least one processor may be further configured to execute the program to select one of a plurality of neural network models included in the image reconstruction module 1100 based on an ISO value included in the shooting condition.

According to an embodiment of the disclosure, the selected neural network model may include a denoising function and may be a neural network model trained by using images containing noise corresponding to the ISO value.

According to an embodiment of the disclosure, in selecting the one of the plurality of neural network models included in the image correction module 1200, the at least one processor may be further configured to execute the program to select a neural network model corresponding to a combination of the selected type of image sensor 100 and the selected detailed component of the image reconstruction module 1100.

According to an embodiment of the disclosure, the selected neural network model may be a neural network model trained to correct image characteristics according to the shooting context.

According to an embodiment of the disclosure, a neural network model included in the image correction module 1200 may include the first neural network model 1210 and the second neural network model 1220, the first neural network model 1210 may be a model trained to minimize a difference between an inference image output when an input image and a correction parameter are fed into the first neural network model 1210 and a label image corresponding to the correction parameter, the label image corresponding to the correction parameter may be an image obtained by correcting the input image by using at least one image correction algorithm to which the correction parameter is applied, the correction parameter fed into the first neural network model 1210 may be a correction parameter inferred when the input image is fed into the second neural network model 1220, and the second neural network model 1220 may be a model trained to minimize a difference between the correction parameter inferred by the second neural network model 1220 when the input image is fed thereinto and a correction parameter that causes the label image to have preset image characteristics.

An embodiment of the disclosure may be implemented or supported by one or more computer programs that may be generated from computer-readable program code and included on computer-readable media. As used herein, the terms "application" and "program" may refer to one or more computer programs, software components, instruction sets, procedures, functions, objects, classes, instances, associated data, or parts thereof suitable for implementation in computer-readable program code. The "computer-readable program code" may include various types of computer code, including source code, object code, and executable code.

The "computer-readable media" may include various types of media that are accessible by a computer, such as read-only memory (ROM), random access memory (RAM), hard disk drives (HDDs), compact discs (CDs), digital video discs (DVDs), or various types of memory.

Furthermore, a computer-readable storage medium may be provided in the form of a non-transitory storage medium. Here, the "non-transitory storage medium" is a tangible device and may exclude wired, wireless, optical, or other communication links that transmit transient electrical or other signals. Moreover, the term "non-transitory storage medium" does not differentiate between where data is semi-permanently stored in the storage medium and where the data is temporarily stored in the storage medium. For example, the "non-transitory storage medium" may include a buffer for temporarily storing data. The computer-readable media may be any available media that are accessible by a computer and include both volatile and nonvolatile media and both removable and non-removable media. The computer-readable media include media on which data may be permanently stored and media on which data may be stored and overwritten later, such as rewritable optical disks or erasable memory devices.

According to an embodiment of the disclosure, methods according to an embodiment of the disclosure may be included in a computer program product when provided. The computer program product may be traded, as a product, between a seller and a buyer. The computer program product may be distributed in the form of a computer-readable storage medium (e.g., CD-ROM) or distributed (e.g., downloaded or uploaded) on-line via an application store or directly between two user devices (e.g., smartphones). For online distribution, at least a part of the computer program product (e.g., a downloadable app) may be at least transiently stored or temporally generated in the computer-readable storage medium such as a memory of a server of a manufacturer, a server of an application store, or a relay server.

The above description of the disclosure is provided for illustration, and it will be understood by those of ordinary skill in the art that changes in form and details may be readily made therein without departing from technical idea or essential characteristics of the disclosure. For example, adequate effects may be achieved even when the above-described techniques are performed in a different order than that described above, and/or the aforementioned components of the systems, structures, devices, circuits, etc. are coupled or combined in different forms and modes than those described above or are replaced or supplemented by other components or their equivalents. Accordingly, the above-described embodiment of the disclosure and all aspects thereof are merely examples and are not limiting. For example, each component defined as an integrated component may be implemented in a distributed fashion, and likewise, components defined as separate components may be implemented in an integrated form.

The scope of the disclosure is defined not by the detailed description thereof but by the following claims, and all the changes or modifications within the meaning and scope of the appended claims and their equivalents will be construed as being included in the scope of the disclosure.

What is claimed is:
1. A method of image processing, the method comprising:
obtaining an image captured via an image sensor;
identifying a shooting context of the image;

selecting a neural network model included in at least one of an image reconstruction module or an image correction module according to the shooting context; and processing the image by using the selected neural network model, wherein the selecting of the neural network model comprises selecting a detailed component of the image reconstruction module based on a shooting condition, wherein a neural network model included in the image correction module comprises a first neural network model and a second neural network model, the first neural network model is a model trained to minimize a difference between an inference image output when an input image and a correction parameter are fed into the first neural network model and a label image corresponding to the correction parameter, the label image corresponding to the correction parameter is an image obtained by correcting the input image by using at least one correction algorithm to which the correction parameter is applied, the correction parameter fed into the first neural network model is a correction parameter inferred when the input image is fed into the second neural network model, and the second neural network model is a model trained to minimize a difference between the correction parameter inferred by the second neural network model when the input image is fed thereinto and a correction parameter that causes the label image to have preset image characteristics.

2. The method of claim 1, wherein the shooting context comprises at least one of the shooting condition or a shooting mode, the shooting condition comprises at least one of an International Standards Organization (ISO) value of the image, a time when the image is captured, or a location where the image is captured, and the shooting mode comprises at least one of a normal shooting mode, a night shooting mode, or a zoom shooting mode.

3. The method of claim 2, wherein a type of the image sensor is selected from among a plurality of different types of image sensors, based on at least one of the shooting condition or the shooting mode.

4. The method of claim 3, wherein the selecting of the neural network model comprises:

selecting the detailed component of the image reconstruction module based on at least one of the shooting context or the selected type of the image sensor; and selecting one of a plurality of neural network models included in the image correction module, based on at least one of the shooting context, the selected type of the image sensor, or the selected detailed component of the image reconstruction module.

5. The method of claim 4, wherein the selecting of the detailed component of the image reconstruction module comprises:

primarily selecting the detailed component, based on at least one of the shooting mode or the selected type of image sensor; and maintaining or changing the primarily selected detailed component, based on the shooting condition, wherein the detailed component of the image reconstruction module corresponding to the shooting mode or the type of the image sensor is predesignated.

6. The method of claim 4, wherein the selecting of the detailed component of the image reconstruction module comprises selecting one of the plurality of neural network models included in the image reconstruction module, based on an ISO value included in the shooting condition.

7. The method of claim 6, wherein the selected neural network model comprises a denoising function and is a neural network model trained by using an image containing noise corresponding to the ISO value.

8. The method of claim 4, wherein the selecting of the one of the plurality of neural network models included in the image correction module comprises selecting a neural network model corresponding to a combination of the selected type of the image sensor and the selected detailed component of the image reconstruction module.

9. The method of claim 8, wherein the selected neural network model is a neural network model trained to correct image characteristics according to the shooting context.

10. A computing apparatus for processing an image signal by using a neural network model, the computing apparatus comprising:

a memory storing a program for processing an image signal; and at least one processor configured to execute the program to obtain an image captured via an image sensor, identify a shooting context of the image, select a neural network model included in at least one of an image reconstruction module or an image correction module according to the shooting context, and process the image by using the selected neural network model, wherein the selecting of the neural network model comprises selecting a detailed component of the image reconstruction module based on a shooting condition, wherein a neural network model included in the image correction module comprises a first neural network model and a second neural network model, the first neural network model is a model trained to minimize a difference between an inference image output when an input image and a correction parameter are fed into the first neural network model and a label image corresponding to the correction parameter, the label image corresponding to the correction parameter is an image obtained by correcting the input image by using at least one correction algorithm to which the correction parameter is applied, the correction parameter fed into the first neural network model is a correction parameter inferred when the input image is fed into the second neural network model, and the second neural network model is a model trained to minimize a difference between the correction parameter inferred by the second neural network model when the input image is fed thereinto and a correction parameter that causes the label image to have preset image characteristics.

11. The computing apparatus of claim 10, wherein the shooting context comprises at least one of the shooting condition or a shooting mode, the shooting condition comprises at least one of an International Standards Organization (ISO) value of the image, a time when the image is captured, or a location where the image is captured, and the shooting mode comprises at least one of a normal shooting mode, a night shooting mode, or a zoom shooting mode.

12. The computing apparatus of claim 11, wherein a type of the image sensor is selected from among a plurality of different types of image sensors, based on at least one of the shooting condition or the shooting mode.

13. The computing apparatus of claim 12, wherein, in selecting the neural network model, the at least one processor is further configured to execute the program to, after selecting the detailed component of the image reconstruction module based on at least one of the shooting context or the selected type of the image sensor, select one of a plurality of neural network models included in the image correction module based on at least one of the shooting context, the selected type of the image sensor, or the selected detailed component of the image reconstruction module.

14. The computing apparatus of claim 13, wherein, in selecting the detailed component of the image reconstruction module, the at least one processor is further configured to execute the program to, after primarily selecting the detailed component based on at least one of the shooting mode or the selected type of the image sensor, maintain or change the primarily selected detailed component, based on the shooting condition, and the detailed component of the image reconstruction module corresponding to the shooting mode or the type of the image sensor is predesignated.

15. The computing apparatus of claim 13, wherein, in selecting the detailed component of the image reconstruction module, the at least one processor is further configured to execute the program to select one of the plurality of neural network models included in the image reconstruction module, based on an ISO value included in the shooting condition.

16. The computing apparatus of claim 15, wherein the selected neural network model comprises a denoising function and is a neural network model trained by using an image containing noise corresponding to the ISO value.

17. The computing apparatus of claim 13, wherein, in selecting the one of the plurality of neural network models included in the image correction module, the at least one processor may be further configured to execute the program to select a neural network model corresponding to a combination of the selected type of the image sensor and the selected detailed component of the image reconstruction module.

18. A non-transitory computer-readable recording medium having recorded thereon a program for performing an image processing method comprising:

obtaining an image captured via an image sensor;

identifying a shooting context of the image;

selecting a neural network model included in at least one of an image reconstruction module or an image correction module according to the shooting context; and processing the image by using the selected neural network model, wherein the selecting of the neural network model comprises selecting a detailed component of the image reconstruction module based on a shooting condition, wherein a neural network model included in the image correction module comprises a first neural network model and a second neural network model, the first neural network model is a model trained to minimize a difference between an inference image output when an input image and a correction parameter are fed into the first neural network model and a label image corresponding to the correction parameter, the label image corresponding to the correction parameter is an image obtained by correcting the input image by using at least one correction algorithm to which the correction parameter is applied, the correction parameter fed into the first neural network model is a correction parameter inferred when the input image is fed into the second neural network model, and the second neural network model is a model trained to minimize a difference between the correction parameter inferred by the second neural network model when the input image is fed thereinto and a correction parameter that causes the label image to have preset image characteristics.

* * * * *